United States Patent
Chanas et al.

(10) Patent No.: US 8,212,889 B2
(45) Date of Patent: *Jul. 3, 2012

(54) METHOD FOR ACTIVATING A FUNCTION, NAMELY AN ALTERATION OF SHARPNESS, USING A COLOUR DIGITAL IMAGE

(75) Inventors: Laurent Chanas, Houilles (FR); Imene Tarchouna, Paris (FR); Frederic Guichard, Paris (FR); Bruno Liege, Boulogne (FR); Jerome Meniere, Paris (FR)

(73) Assignee: DXO Labs, Boulogne Billancourt (FR)

( * ) Notice: Subject to any disclaimer, the term of this patent is extended or adjusted under 35 U.S.C. 154(b) by 93 days.

This patent is subject to a terminal disclaimer.

(21) Appl. No.: 12/820,951

(22) Filed: Jun. 22, 2010

(65) Prior Publication Data

US 2011/0019065 A1    Jan. 27, 2011

Related U.S. Application Data

(62) Division of application No. 11/817,977, filed as application No. PCT/FR2006/050197 on Mar. 6, 2006, now Pat. No. 7,920,172.

(30) Foreign Application Priority Data

Mar. 7, 2005   (FR) ..................... 05 50601

(51) Int. Cl.
- *H04N 9/73*    (2006.01)
- *H04N 9/64*    (2006.01)
- *G06K 9/00*    (2006.01)
- *G06K 9/40*    (2006.01)

(52) U.S. Cl. ............... 348/224.1; 348/242; 382/167; 382/255

(58) Field of Classification Search ............... 348/222.1, 348/223.1, 224.1, 241, 242, 349, 353; 382/167, 382/255, 274

See application file for complete search history.

(56) References Cited

U.S. PATENT DOCUMENTS

| | | | |
|---|---|---|---|
| H101 H | | 8/1986 | Walker |
| 5,161,107 A | | 11/1992 | Mayeaux et al. |
| 7,379,561 B2 | | 5/2008 | Chauville et al. |
| 7,477,290 B2 * | | 1/2009 | Okada .................. 348/208.6 |
| 2004/0165090 A1 | | 8/2004 | Ning |

(Continued)

FOREIGN PATENT DOCUMENTS

EP    0 878 970    11/1998

(Continued)

OTHER PUBLICATIONS

Buzzi, Jerome et al., "Uniqueness of Blur Measure", International Conference on Image Processing, pp. 2985-2988, 2004.

*Primary Examiner* — Daniel M Pasiewicz

(74) *Attorney, Agent, or Firm* — Oblon, Spivak, McClelland, Maier & Neustadt, L.L.P.

(57) ABSTRACT

The invention concerns a method for activating a function by using a measurement taken from at least one digital image (10) having at least two colors (195, 196) and originating from an image-capturing apparatus, the method including measuring the relative sharpness (190) between at least two colors in at least one region R of the image, and Controlling at least one action (191) depending on the measured relative sharpness.

14 Claims, 7 Drawing Sheets

U.S. PATENT DOCUMENTS

Figure 1A:
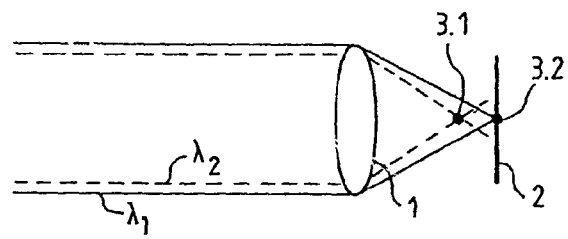

| | | |
|---|---|---|
| 2004/0208475 A1 | 10/2004 | Ohmura et al. |
| 2005/0231618 A1 | 10/2005 | Sugiyama |
| 2006/0093234 A1* | 5/2006 | Silverstein .................... 382/255 |

FOREIGN PATENT DOCUMENTS

| | | |
|---|---|---|
| EP | 1 067 779 | 1/2001 |
| EP | 1 473 671 | 11/2004 |
| JP | 63-247680 | 10/1988 |
| JP | 2000-299874 | 10/2000 |
| WO | 93/11631 | 6/1993 |
| WO | 2005/117455 | 12/2005 |

* cited by examiner

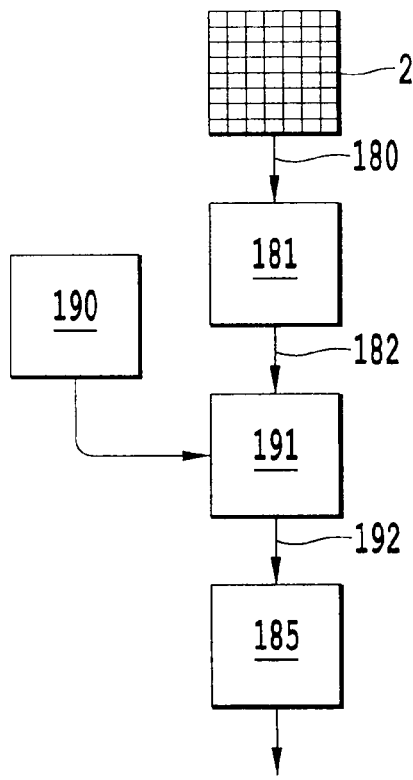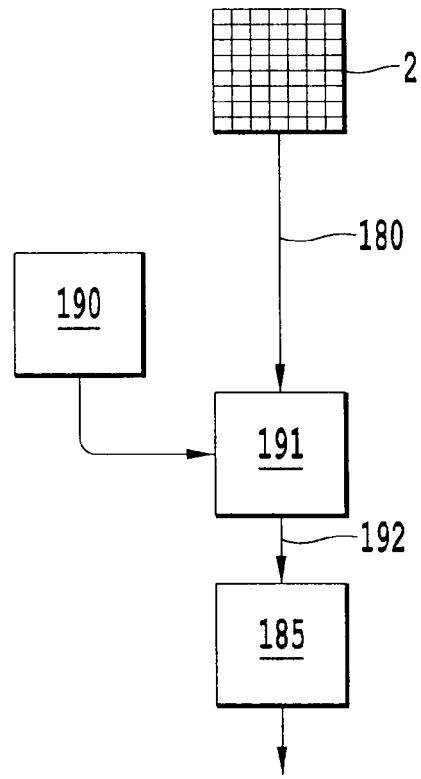
*Fig.18.1*   *Fig.18.2*
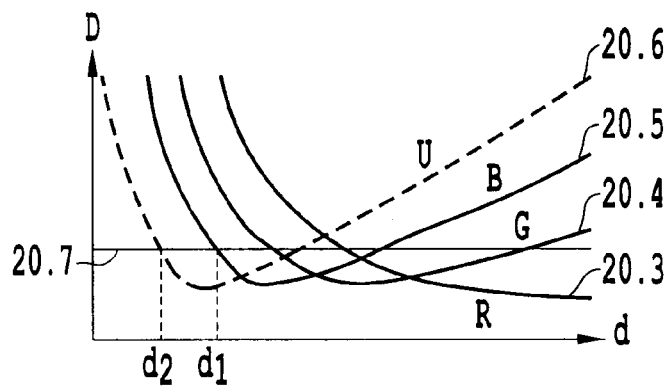
*Fig.20.1*
*Fig.20.2*

FIG 19.1
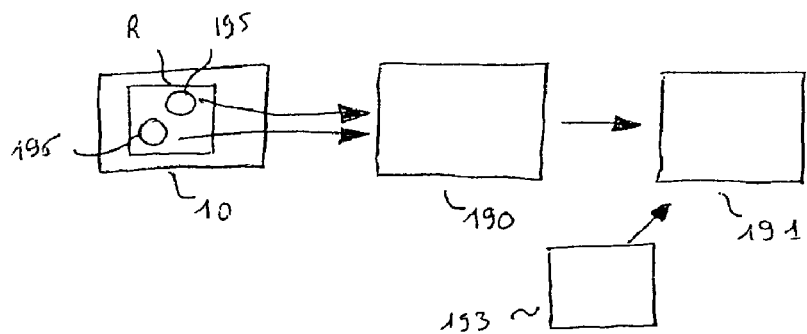
FIG 19.2
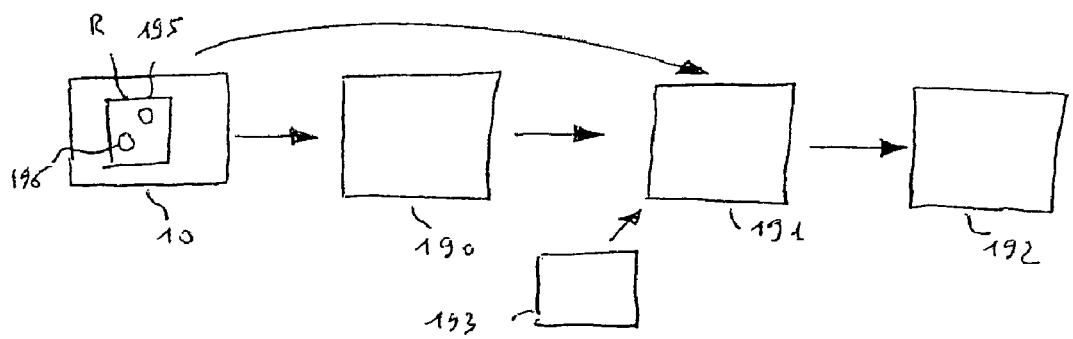
FIG 19.3
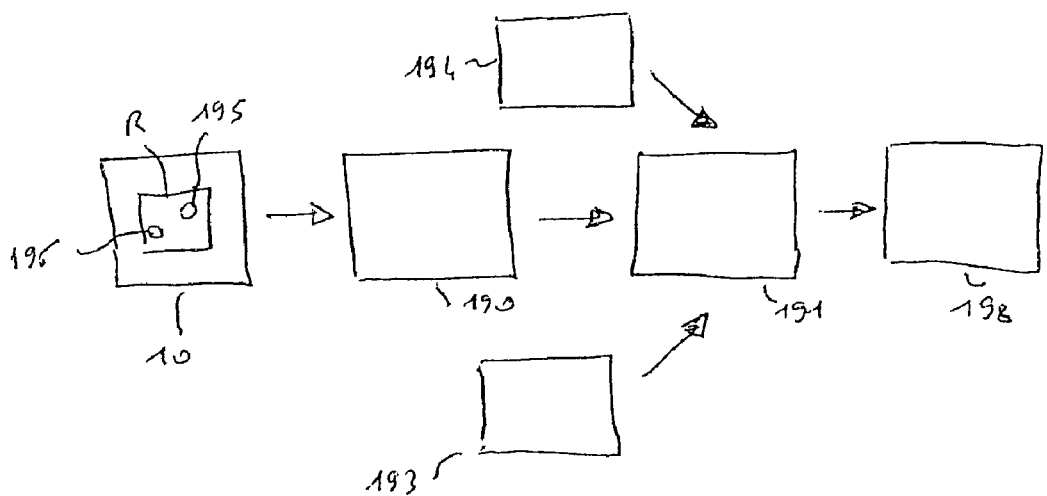

METHOD FOR ACTIVATING A FUNCTION, NAMELY AN ALTERATION OF SHARPNESS, USING A COLOUR DIGITAL IMAGE

CROSS-REFERENCE TO RELATED APPLICATIONS

This application is a division of and claims the benefit of priority under 35 U.S.C. §120 from U.S. Ser. No. 11/817,977 filed Sep. 7, 2007, the entire content of which is incorporated herein by reference. U.S. application Ser. No. 11/817,977 is the National Stage of PCT/FR06/50197 filed Mar. 6, 2006, and claims the benefit of priority under 35 U.S.C. §119 from French Patent Application No. 0550601 filed Mar. 7, 2005.

FIELD OF THE INVENTION

The invention relates to a method for activating a function, namely an alteration of sharpness, using a colour digital image. It concerns more particularly, though not exclusively, an improvement of the sharpness of at least one colour of a digital image. The invention also concerns a system implementing such method, as well as an image generated by such method.

The invention further concerns an embodiment for an image-capturing and/or reproducing apparatus comprising an optical system for capturing and/or reproducing images, an image sensor and/or generator and/or a servo-control system, the image being processed, in view of its improvement, by digital image-processing means.

The invention also concerns an apparatus obtained by such embodiment method.

Problem Concerned

The satisfactory visualisation of an image requires sharpness to be all the more important than such image represents detail in compact dimensions.

Thereby, it is well known to seek to improve the sharpness of at least one colour in a digital image according to methods, such as described below:
i) In this specific case of cameras:
it is possible to use an optical focussing device (focus) which moves the optical elements enabling to have a varied range of distances for which the image is sharp. Such a device, manual or motorised, often comprises a servo-control system enabling to choose the movement depending on the distances of the objects in the scene.
The applications of such a method are cameras and cine-cameras. It has the inconvenience of having a limited depth of field, especially at wide aperture, and a cost and overall size that are not easily adapted to small-size devices, such as telephones.
It is possible to employ a wavefront coding type solution, which adds a specific optical element to the optical system, thus enabling reconstruction by calculating sharpness with a larger depth of field.
The applications of such a method are limited (microscopy) and represent disadvantages requiring a specific optical element as well as an adjustment to the hardware, including the optical system.
It is possible to implement a solution that adds a specific optical element comprised of a flexible liquid lens that is fixed in relation to the optics. Such a method represents a servo-control system enabling to choose the shape of the said lens depending on the distances of the objects in the scene.
The applications of this solution (for cameraphones or cameras) have the disadvantage of being a specific manufacturing method, of being costly and having a bulky optical element, and of requiring a hardware adaptation.
ii) In a more general context, the solutions are:
deblurring algorithms on the brightness or on a colour, by increasing sharpness via the "sharpen" method or any another method of calculation.

The applications of such a method (all picture-taking apparatus) represent the disadvantages of having a limited increase in sharpness and thus a very slight increase in the depth of field.

Furthermore, the known design or embodiment techniques of such image-capturing and reproducing apparatus, such as digital or argentic cameras, consist of first selecting the properties of the hardware elements of the apparatus, namely the optical system, the sensor and the servo-control system. Then, as necessary, digital image-processing means are provided for, in order to correct the defects of at least one of the hardware elements of the apparatus.

In particular, in order to design an optical system for an apparatus, it is first necessary to compile a requirements' specification charter, i.e., stating the overall dimensions, the focal length ranges, the aperture ranges, the field covered, the performances expressed, either in image spot size or in MTF (Modular Transfer Function), and the cost. Using such requirements' specification, the type of optical system can be selected and, using an optical calculation software tool, such as the "Zemax" tool, the parameters of this system can be calculated, enabling to comply with the requirements' specifications as far as possible. Such optical system focussing is performed interactively. Generally-speaking, an optical system is designed for the purpose of representing the best quality at the centre of the image, while the quality of the image borders is usually of an inferior quality.

Furthermore, the common techniques are such that the optical system is designed in order to obtain a determined level of distortion, of vignetting, of blur and of depth of field, thus enabling to compare the optical system with other optical systems.

Moreover, for digital photographic apparatus, the sensor specifications are also stated, namely: the quality of the pixels, the surface area of the pixels, the number of pixels, the micro-lens matrix, the anti-aliasing filters, the geometry of the pixels and the layout of the pixels.

The common technique consists of selecting the sensor of an image-capturing apparatus independently from the other parts of the apparatus and, notably, from the image-processing system.

An image-capturing and/or generating apparatus also commonly comprises one or several servo-control systems, such as an exposure system and/or a focussing system (automatic focus or "autofocus") and/or a flash-control system.

Thereby, in order to specify an exposure system which activates the aperture and the exposure time, possibly the sensor gain, means for measuring are determined; shall be especially determined the image zones on which exposure shall be measured, in addition to the weight affected to each zone.

For a focussing system, shall be determined the number and the position of image zones to be used for focussing. Shall also be specified, for example, recommendations for the driver movement.

Whatever the case, such specifications are applied, regardless of whether there exist digital means for image-processing or not.

The Invention:

Observations Concerning the Invention:

The invention stems from the combination of the following observations, which concern it alone:

i) The image-capturing and/or processing apparatus generate on such images a variable sharpness, which depends upon the considered colour, as described below by way of FIGS. 1a and 1b.

FIG. 1a shows the converging lens 1 of an optical device (not illustrated) equipped with a sensor 2 located on a point 3.2 of focus associated to a wavelength λ2. Hence, the colour defined by this length λ2 is sharp on an image formed by such lens when the image represents an object way off in the distance.

Nevertheless, such adjustment entails three problems:

First of all, the point 3.2 of the lens focus directly relates to the colour defined by this wavelength λ2, such that a point of focus 3.1 directly relating to another colour defined by a wavelength λ1 is located upstream from the sensor.

Consequently, the image formed by this second colour (λ1) at sensor level is not as sharp as the image formed by the first colour (λ2), thus reducing the sharpness of the overall image formed by the sensor.

Secondly, the point of focus of the lens for a wavelength is variable, depending on the distance separating it from object 4 represented on the image.

Figure 1B:
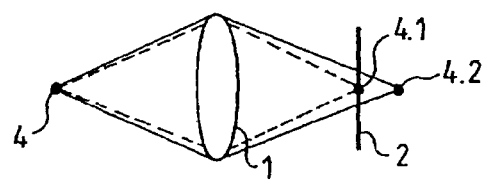

Hence, FIG. 1b shows the new locations 4.1 and 4.2 of the points of focus, respectively associated to the wavelengths λ1 and λ2, when the object represented passes from a far-off distance (FIG. 1a) to a more close-up distance (FIG. 1b).

In such latter case, it appears that the sensor is located on the point of focus of the colour (λ1) which, beforehand, did not provide a sharp image.

Figure 2:
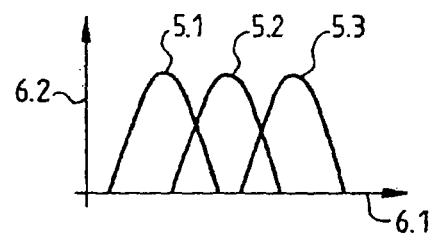

Thirdly, the point of focus of the lens for a wavelength and a distant object is variable, depending on the position of the object represented in the image.

ii) As shown in FIG. 2, which is an example of spectral distribution for an image according to axis 6.1, the images are generally comprised of several colours, the intenseness of which (Y-axis 6.2) can be similar. In this example are represented the blue components 5.1 (wavelength approximately 450 nm), the green components 5.2 (wavelength approximately 550 nm) and the nearby red components (wavelength approximately 600 nm), although it is clear that the invention is applied to an image regardless of its considered colour and wavelength distribution (for example, infrared or ultraviolet).

iii) The standard sharpness-improvement techniques do not take advantage of the fact that one of the colours can be sharper than the others depending on the distance of the object represented on the image.

iv) Furthermore, the invention stems from the observation that the standard apparatus' design or embodiment techniques do not enable to fully take advantage of the possibilities offered by the digital means of image-processing.

The Invention:

Thereby, the invention concerns, in a general manner, a sharpness-improvement method for at least one colour of a digital image, comprising the steps of selecting from among the image colours at least one colour referred to as a sharp colour, reflecting the sharpness of the sharp colour onto at least one other improved colour, in order that the improved colour represents increased sharpness, In light of the invention, it is thus possible:

to increase the image's perceived sharpness, to increase the depth of field of a capturing apparatus, to create a macro function, to control the depth of field, regardless of the exposure, to measure the distance of the objects of an imaged scene using an image, to improve the exposure and/or focussing and/or flash servo-control devices, to reduce the costs of the capturing apparatus, to reduce, in terms of equal performance, the size of the capturing apparatus, to read bar-codes and/or business cards and/or written text and/or take portraits and/or landscape views, using a same lens, having a fixed focus, like, for example, that of a cameraphone, to design and/or choose a lens that gives the apparatus increased specifications, notably in terms of aperture and of depth of field, to create image effects depending on the relative sharpness between at least two colours and/or on the distance of objects of the imaged scene, to enable the user to digitally change the image focus of the relative sharpness between at least two colours and/or of the distance of objects of the imaged scene, to reduce the time between the request for capture and the actual image capture, by eliminating or simplifying the optics system for focussing.

The invention further concerns an embodiment for a capturing apparatus, comprising an optical capturing system, a sensor and/or a servo-control system, the image being processed, in view of its improvement, by digital image-processing means;

a method wherein the user determines or selects the optical system and/or the sensor and/or the servo-control system parameters, using the capacity to process images via digital means, in order to minimise embodiment costs and/or to optimise the performances of the capturing apparatus.

In an embodiment, the method further comprises the step of decomposing the digital image into regions, the said sharp colour being selected for each region.

In an embodiment, the said sharp colour selection consists of choosing the sharpest colour according to a pre-determined rule.

In an embodiment, the said "sharp colour" selection is pre-determined.

In an embodiment, the said digital image stems from a capturing apparatus and the said sharp colour selection depends upon the distance between the capturing apparatus and at least one object of the captured scene in order to obtain the said digital image.

In an embodiment, the said image-capturing apparatus comprises a macro mode, the said sharp colour selection depending upon activation of the macro mode.

In an embodiment, the said digital image stems from a capturing apparatus, the said method further comprising the step for determining the distance between the capturing apparatus and at least one object of the captured scene using the sharpness of at least two colours in an image region of the said object.

In an embodiment, the method further comprises the step to reduce the sharpness of at least one colour within at least one image region.

In an embodiment, the method further comprises the step for determining a servo-control instruction for the said capturing apparatus using the sharpness of at least two colours, in order that focussing is achieved in fewer steps and is accelerated.

In an embodiment, the said digital image stemming from a capturing apparatus comprising a lens, the said method further comprises the step for selecting a lens from among a series of pre-determined lenses, the said lens representing specifications such that the images of an object having at least two pre-determined distances represent distinct sharp colours, thus improving the depth of field and/or reducing the cost of the lens.

In an embodiment, the said digital image stemming from a capturing apparatus comprising a lens, the said method further comprises the step to design a lens by taking account of the method according to the invention, the said lens representing specifications such that the images of an object having at least two pre-determined distances represent distinct sharp colours;

in order that the depth of field and/or the aperture and/or every other optical specification is improved and/or the cost of the optics is reduced.

in order that the mechanical focussing can be achieved using fewer positions.

In an embodiment, the repercussion of the sharpness of the sharp colour on at least one other improved colour is embodied by using a calculation of the type CA=CN+F(CO−CN), where CA represents the improved colour, CO represents the improved colour prior to processing, CN represents the sharp colour and F represents a filter, namely a low-pass filter.

The invention further concerns an embodiment for an image-capturing and/or reproducing apparatus (20) comprising an optical system (22, 22') for capturing and/or reproducing images, an image sensor (24) and/or generator (24') and/or a servo-control system (26), the image being processed, in view of its improvement, by digital image-processing means (28, 28'), the method being such that the user determines or selects the optical system and/or the sensor and/or the image generator and/or the servo-control system parameters, using the capacity to process images via digital means, and especially for improving the sharpness of a colour depending on the sharpness of another colour in accordance with a method complying with one of the previous claims, in order to minimise the embodiment costs and/or to optimise the performances of the image-capturing and/or reproducing apparatus.

The invention also concerns an image-capturing and/or reproducing apparatus using a colour-improvement method according to one of the preceding embodiments and/or obtained via an embodiment according to the previous embodiment.

The invention also concerns a digital image obtained according to a method complying with one of the preceding embodiments or using an apparatus complying with the previous embodiment.

Finally, the invention also concerns a digital image-processing device implementing a method according to one of the preceding embodiments.

DEFINITIONS

Hereunder are noted the meanings of the various terms employed:

By digital image is meant an image produced under digital form. The image may stem from an image-capturing apparatus.

The digital image may be represented by a series of digital values, hereinafter referred to as "grey level", each digital value being linked to sensitivity in terms of colour and to a relative geometrical position on a surface or within a volume.

Colour, within the meaning of the invention, is referred to as a series of digital values linked to such same sensitivity in terms of colour.

The digital image is preferably the raw image from the sensor prior to "demosaicing" (i.e. removing the matrix). The digital image may also have been processed, for example demosaicing or white balancing. According to the invention, the digital image shall preferably not have undergone subsampling.

If the digital image stems from an image-capturing apparatus, such image-capturing apparatus shall comprise a sensor equipped with sensitive elements. By sensitive element is meant a sensor element enabling to convert a flow of energy into an electric signal. The flow of energy can notably take the form of a luminous flow, of X-rays, of a magnetic field, of an electromagnetic field or of sound waves. The sensitive elements may be, depending on the case, juxtaposed on a surface and/or superimposed within a volume. The sensitive elements may be placed according to a rectangular matrix, a hexagonal matrix or any other geometry.

The invention is applied to sensors comprising sensitive elements of at least two different types, each type having sensitivity in terms of colour and each colour sensitivity corresponding to the part of the energy flow converted into an electric signal by the sensor's sensitive element. In the case of a visible image sensor, the sensors are generally sensitive to 3 colours, the digital image also having 3 colours: red 5.1, green 5.2 and blue 5.3, as illustrated in FIG. 2, which shows the amount of converted energy on the vertical axis 6.2 and the length of the wave on the horizontal axis. Some sensors are sensitive to 4 colours: red, green, emerald and blue.

By colour is also meant a combination, especially linear, of signals emitted by the sensor.

The invention is applied using the various known definitions of every known sharpness. For example, the sharpness of a colour may correspond to the measurement of a value referred to as "BXU", which is a measurement of the blur spot surface, such as described in the article published in the "Proceedings of IEEE, International Conference of Image Processing, Singapore 2004", and entitled "Uniqueness of Blur Measure" by Jerôme BUZZI and Frédéric GUICHARD.

Simply-speaking, the blur of an optical system is measured from the image, called "impulsive response", from an infinitely small point located within the sharpness plane. The BXU parameter is the variation of the impulsive response (i.e. its average surface). The processing capacity may be limited to a maximum BXU value.

Diverse measuring methods for such sharpness are described in such handbooks and publications as, for example, the "Handbook of Image&Video processing", edited by Al Bovik and published by the Academic press, pages 415 to 430.

A parameter refers to the quality of an image, such as generally accepted. In an embodiment, the sharpness of a colour is achieved by calculating a gradient. For example, the sharpness of a colour may be obtained by calculating a gradient of 9 levels of grey matter taken from neighbouring geometrical positions within the colour considered.

The invention refers to the sharpness of at least two colours. According to an embodiment, the sharpness of at least two colours is only considered in a relative manner, one in relation to the other. For such embodiment, a gradient enables to simply calculate a relative sharpness between two colours, irrespective of the image contents.

The invention refers to selecting, from among the colours, at least one colour referred to as "sharp colour". According to an embodiment, such selection is possible by determining which colour out of at least two is the sharpest. For such embodiment, a gradient enables to simply determine the sharpest colour from among at least two colours.

In an implementation,

An image-capturing apparatus is, for example, a disposable camera, a digital camera, a reflex camera (digital or not), a scanner, a fax machine, an endoscope, a cine-camera, a camcorder, a surveillance camera, a game, a cine-camera or photo apparatus integral with or linked to a telephone, to a personal assistant or to a computer, a thermic camera, an ultrasound apparatus, an MRI (Magnetic Resonance Imaging) apparatus, a X-ray radiography apparatus.

It should be noted that the present invention refers to such types of apparatus, if they process images comprising at least two colours.

By optical system for image-capturing is meant the optical means enabling to reproduce the images on a sensor.

By image-capturing is meant the mechanical, chemical or electronic means enabling to capture and/or record an image.

By servo-control system is meant the means, whether of the mechanical, chemical, electronic or information technology type, enabling the elements or parameters of the apparatus to comply with instructions. It especially refers to the automatic focussing system (autofocus), to the automatic white-balance control, to the automatic exposure control, to the control of the optical elements, in order, for example, to maintain a uniform image quality, to an image-stabilising system, to an optical and/or digital zoom factor control system, to a saturation control system, or to a contrast-control system.

The digital image-processing means may adopt diverse forms depending on their application.

The digital image-processing means may be integrated, partially or wholly, into the apparatus, such as in the following examples:

An image-capturing apparatus which produces altered images, for example, a digital photo apparatus with integral image-processing means.

An image-reproducing apparatus which displays or prints altered images, for example, a video projector or a printer comprising image-processing means.

A multi-function apparatus which corrects the defects of its elements, for example, a scanner/printer/fax machine comprising image-processing means.

A professional image-capturing apparatus which produces altered images, for example, an endoscope comprising image-processing means.

According to an embodiment:

the digital image-processing means include means for improving the image quality by activating at least one of the parameters of the group comprising: the geometric distortions of the optical system, the chromatic aberrations of the optical system, the compensation of the parallax, the depth of the field, the vignetting of the optical system and/or of the image sensor and/or generator, the lack of sharpness of the optical system and/or of the image sensor and/or generator, the noise, the moiré phenomena, and/or the contrast, and/or the given or selected parameters of the optical system are chosen from within the group comprising: the number the system's optical elements, the type of the materials comprising the optical elements of the optical system, the cost of the materials for the optical system, the processing of the optical surfaces, the assembly tolerances, the value of the parallax according to the focal length, the aperture specifications, the aperture mechanisms, the range of possible focal lengths, the focussing specifications, the focussing mechanisms, the anti-aliasing filters, the overall dimensions, the depth of the field, the specifications linking the focal length and the focussing, the geometric distortions, the chromatic aberrations, the off-cantering, the vignetting, the sharpness specifications, and/or the given or selected parameters of the image-capturing and/or generating apparatus are chosen from within the group comprising: the quality of the pixels, the surface area of the pixels, the number of pixels, the micro-lens matrix, the anti-aliasing filters, the geometry of the pixels, the layout of the pixels.

and/or the given or selected parameters of the servo-control system are chosen from within the group comprising: the focussing measurement, the exposure measurement, the white balance measurement, the focussing instructions, the aperture instructions, the exposure instructions, the sensor-gain instructions, the flashlight instructions.

For the servo-control system enabling automatic focussing, it is recalled that focussing may be performed in various manners, particularly by controlling the position of mobile elements of the optical system or by controlling the geometry of the flexible optical elements.

The performances of a capturing apparatus are notably its cost, its overall dimensions, the quantity of minimal light that it may receive of emit, the image quality, namely its sharpness, the technical specifications of the optics, the sensor and the servo-control, as well as its depth of field.

Thereby, it should be noted that the depth of field can be defined as the range of distances in which the object generates a sharp image, i.e. where the sharpness exceeds a given threshold for a colour, generally green, or even defined as the distance between the nearest object plane and the farthest object plane for which the blur spot does not exceed the pre-determined dimensions.

As the colour green is predominant for defining the sharpness of an image, as subsequently explained, it is also common to use green to define the depth of field.

The invention also concerns an apparatus obtained through the embodiment method, such as defined above.

According to other specifications of the invention, which may be used separately from or combined with those described above:

The invention concerns a method for activating a function using a measurement performed on at least one digital image, having at least two colours, originating from an image-capturing device, wherein:

the relative sharpness is measured between at least two colours in at least one region R of the image, and a function is activated depending on the measured relative sharpness.

By region is meant a part of or the whole of the image. A region comprises one or several pixels, adjacent or not.

Hence, the action is notably adapted to the distance between the imaged object and capturing apparatus, or is adapted to the relative depth between two imaged objects.

It is possible to measure the relative sharpness in various manners, for example (though without such list being exhaustive):

the sharpest colour can be determined, and/or at least one colour, referred to as "sharp colour", can be selected from among the colours, and/or sharpness between the colours can be compared, and/or a sharpness difference can be calculated, and/or the relative sharpness can be directly calculated.

Various examples of relative sharpness measurements will be explained hereafter, notably illustrated in FIGS. 3a, 3b, 4, 5, 6, 7, 8, 9 and 10.

The relative sharpness and/or the measurement of relative sharpness in a region may be expressed by a single digital value, for example, realising the average relative sharpness in the region, or by way of several digital values realising the relative sharpness in various parts of the region.

According to the invention, at least one function is activated, depending on the measured relative sharpness. Such action is notably (though without such list being exhaustive):

direct or indirect processing (especially via the provision of processing or distance-data and/or position and/or direction parameters) of the digital image and/or of another digital image, and/or a distance and/or direction and/or position and/or size and/or orientation and/or geometric form measurement of at least one part of at least one object or subject of the scene, and/or data directly or indirectly linked to the geometry of the imaged scene in three dimensions, and/or an object detection, notably a face and/or the main subject or subjects, and/or object recognition and/or authentication, for example, a face, and/or a position and/or movement measurement of the apparatus, and/or a servo-control of the apparatus or of another device, such as a robot, and/or automatic framing of the main subject, and/or one adjustment alteration of the apparatus, and/or the production or the activation of a signal, and/or an addition, an elimination or alteration of an object within the digital image or another digital image, and/or any other action directly or indirectly using the relative sharpness measurement.

According to an embodiment, the action implements:

the digital image, and/or another digital image, and/or choice by the user of the apparatus, and/or at least one specification of the capture apparatus during picture-taking, and/or other data.

In the event where the action relates to direct or indirect processing, the process may consist of one of the following actions (though without such list being exhaustive):

digitally altering focussing, and/or creating image effects depending on the relative sharpness between at least two colours and/or on the distance of objects of the imaged scene, and/or reducing the sharpness of at least one colour within at least one region of an image, and/or increasing the sharpness of at least one colour within at least one region of an image, and/or activating compression, and/or embodying any other process described herein.

The use of the measured relative sharpness for activating the function especially enables the function to be adapted to the distance between at least one part of an imaged object and the measuring apparatus, and/or to the geometry of at least one part of an object, and/or to the position and/or the size of at least one part of the object, and/or to the direction of at least one part of the object.

The known methods do not enable activation of such type of function as from a relative sharpness measurement of at least one image region, but rather require the use of a particular device, in addition to the image-capturing apparatus, for the purpose of estimating a distance. Furthermore, the known methods only enable a distance measurement in one particular point or in a limited number of points, whereas the invention enables to measure the distance in a vast number of points simultaneously.

According to an embodiment, the function activated is included in the group comprising:

determination of the distance between the capturing apparatus and at least one object imaged by the digital image, and/or determination of the relative distance between two imaged objects, an action depending on the said distance and/or the said relative distance, a process on at least one zone Z' of the digital image and/or of another digital image, a servo-control of the capturing apparatus and/or a servo-control of another apparatus, the provision of an indication and/or alarm and/or alert signal to a user, the detection of a part of the image, an alteration of a colour sharpness, a determination of the position and/or of the movement of the capturing apparatus, the determination of a subject's position within the image, an alteration of at least one image specification, an alteration of all or part of the image, the determination of a zone of interest inside the image, notably in order to provide a servo-control signal, the alteration of the resolution for all or part of the image, the provision of data relating to the image, the provision of data to a sound-capturing device, the parametering of a compression, an alteration of all or part of the image, at least one adjustment of the capturing apparatus.

According to an embodiment, the function activated comprises a process on at least one zone Z' of the digital image and/or of another digital image.

The zone Z' is a part or not of the digital image on which the relative sharpness has been measured.

As a processing example performed on a digital image, separate from that on which has been measured the relative sharpness between at least two colours, can first be quoted the taking of a video sequence wherein the next image, or another image, can be processed, such process consisting of increasing the sharpness (also given as an example).

Indeed, the sharpness of a next image can be increased, since it is based upon the measurement of a preceding image which is hardly distinguishable from such next image. Hence, it not necessary to save the current digital image in the memory.

In another example: the sharpness measurement is, within a digital photo apparatus, performed on the image displayed prior to the actual taking of the picture; the image taken is processed at a later stage at full resolution (while the measurement taken on the image displayed prior to the actual picture-taking is generally at a lower resolution) using the last measurement or a combination of last measurements.

In an embodiment, the zone Z' constitutes all or part of the digital image region (on which the relative sharpness measurement has been taken), and/or the whole digital image, and/or a separate zone from the digital image region, and/or another digital image, and/or another whole digital image.

When the zone Z' constitutes all or part of the digital image region, for example when the depth of field needs to be increased, the zone Z' is a pixel; a region of N pixels, on which is measured the relative sharpness, is defined in accordance with such relative sharpness, wherein a filter is applied for the purpose of transporting the sharpness of the sharpest colour to the other colour in order that the sharpness of the pixel is increased. By repeating this operation for each pixel, the depth of field is thus increased.

The zone Z' on which is performed the process may constitute a full digital image, notably when the sharpness on the full image is increased.

As an example of a process on a distinct zone of the digital image region, the case where the relative sharpness measurement is performed on a region shall be quoted, whereby the process is applied on a centred image part corresponding to a digital zoom.

As an example of a process applied to a zone of another digital image and/or to another full digital image, the above example of a video sequence is recalled, the other digital image being, for example, an image following a video image; the other image is also, for example, the digital image taken at full resolution for a photo apparatus, whereas the image on which the measurement is taken is at low resolution.

In an embodiment, the zone Z', for which a process is activated, includes at least one pixel of an image, while the region includes a predetermined vicinity of the corresponding pixel in the digital image. The processed image may be the digital image. The processed image may also be another image, for example an image stemming from the same capturing apparatus and captured after the digital image. In such a case, the correspondence between the pixels of the two images can be achieved by associating the pixels of the two images situated in the same place. Such case has the advantage of preventing digital-image storage between the measurement and the processing without any troublesome artefact, if the images are captured within a short time frame, for example 1/15 s.

In an embodiment, this treatment is applied to all the pixels of an image. The processed image may be the digital image. The processed image may also be another image, for example an image stemming from the same capturing apparatus and captured after the digital image.

In an embodiment, the process on at least the zone Z' includes the alteration of at least one image specification included within the group comprising: sharpness, contrast, luminosity, detail, colour, the type of compression, the rate of compression, the image contents, the resolution.

Example of Contrast Alteration:

The contrast of the close-up objects is increased and the contrast of the background objects is reduced, for example in the case of a video-conference. Conversely, the contrast of the close-up objects can be reduced and that of the background objects can be increased in order to diminish the blurring effect.

Example of Luminosity Alteration:

The process may involve the brightening of close-up objects and the darkening of the background, e.g. for a video-conference. Conversely, for an image taken using the flashlight, the luminosity process shall consist of lightening up the background and dimming the close-up objects in order to compensate the flashlight effect.

Example of Detail Alteration:

For a video-conference, the detail of the background objects can be reduced in order to allow a higher compression for such background objects, while maintaining maximum quality for the main subject.

Example of Colour Alteration:

Saturation in terms of the colours of the regions is reduced, i.e. where the relative sharpness exceeds a threshold, in order to eliminate the excessive longitudinal chromatic aberrations, sometimes called "purple fringing".

Example of Compression-Type Alteration:

For a video-conference, for example, a near object/distant object segmentation is provided to a codec MPEG-4 in order to enable the distant object to be highly compressed for the purpose of maintaining maximum quality for the close-up main subject.

Example of Compression-Rate Alteration:

As mentioned above in the case of a video-conference, the compression rate can be higher for the background than for the main subject.

Example of Contents Alteration:

The process consists of replacing a background by a landscape or a decor.

In an embodiment, the process includes a sharpness alteration for each pixel of the zone Z', by way of a filter mixing the values attached to the pixel within a predetermined vicinity of each pixel, the parameters of the filter depending upon the measured relative sharpness.

In an embodiment the zone Z' is determined using the measured relative sharpness.

For example, the Z' zone corresponds to the image parts where the relative sharpness is comprised within a given range corresponding to the parts of the image containing objects located within a given range of distances, which enables, for example, to separately process a foreground and a background.

Within the meaning of the invention, the French "arrière-plan" and "fond" have the same connotation of "background" as in English where no difference is made.

In an embodiment, the zone Z' constitutes a background for an image, notably destined for remote transmission, especially through a system of visio or video-conferencing. The processed image may be the digital image. The processed image may also be another image, for example an image stemming from the same capturing apparatus and captured after the digital image.

According to an embodiment, the process includes the provision of data depending on the distance between the imaged object and the capturing apparatus for all or part of the pixels of the zone Z', and where a storage and/or a transmission and/or a use of such data is activated depending on the distance, the stored data notably being saved in a data-processing file, namely in an image file.

It is recalled that the zone Z' can constitute a point and/or a region and/or several regions and/or a full image and/or a main subject and/or a background.

The data depending on the distance can be a distance with, for example, a precision indication or a range of distance values, like, for example, a distance less than one centimeter, a distance comprised between 1 and 10 centimeters, then between 10 centimeters and 1 metee, and finally beyond one meter. The data depending on the distance can also be represented by a criterion of the "too close", "close", "near", "far" or "macro" type. The data depending on the distance can also be converted into information on the type of objects or subjects, such as "portrait" or "landscape".

Hence, a map of the distances of the various parts of the image may also be provided. It is also possible to provide the position of the zone in relation to the capturing apparatus.

The data depending on the distance can also comprise distance values for the various elements of the image, such as the minimum distance, the maximum distance, the average and the typical difference.

It is important to note that the invention enables to measure several distances within a scene using a single image, whereas the prior art requires complex means, such as using several cameras placed in several positions in order to achieve the stereoscopy, or a travelling camera, or a laser range-finder, or even an ultrasound sonar which does not enable to obtain a visible image.

In an embodiment, the function activated includes a servo-controlling function for the capturing apparatus comprised within the group constituted by: a servo-control for focussing, a servo-control for exposure, a servo-control for flash, a servo-control for image-framing, a servo-control for white-balancing, a servo-control for image-stabilising, a servo-control for another apparatus or device linked to the capturing apparatus, such as the guiding of a robot.

Example of a Servo-Control Focussing Function:

The main subject or the zones of interest can be detected by the distance measurements, as from sharpness, the main subject or the zone of interest thus being the nearest zone.

A servo-control for focussing, embodied using measurements taken directly from a single digital image, is particularly advantageous in relation to the known focussing servo-controls, or "autofocus", for which it is necessary to take measurements from successive images.

Moreover, a known focussing servo-control consists of pressing a trigger element until half-way down, then of moving framing before pressing down completely, whereas with the invention, focussing can be achieved in an entirely automatic manner; the invention thus enables a gain of time and a better image.

Example of a Servo-Control Exposure Function:

Similar to the focussing servo-control, the exposure adjustment is achieved on the main subject, which is automatically detected; hence exposure can be correct whatever the position of the main subject within the image frame. In other words, similar to the focussing, the user has no need to aim at the subject, then press half-way down before moving the framing.

Example of a Flashlight Servo-Control:

As the invention enables to determine the main subject, brightening function can be activated according to the main subject, while with the state of the art, the strength of the flashlight is adjusted in accordance with the focussing without determination of the main subject, i.e. the nearest subject in particular. As indicated above, the subjects in the least light can be processed digitally through brightening.

Example of Control of Another Device:

When a mobile robot has to move, the regions the nearest to the mobile robot are determined, with a trajectory, free of all hindrance, being determined as from the objects the nearest to the mobile robot.

In an embodiment, the function activated includes a provision of a signal, such as an indication signal of the main focal point of the digital image and/or of a focussing zone, and/or an alarm signal indicating an alteration of the digitally-monitored and imaged scene and/or of the distance of at least one part of the imaged scene, to the capture apparatus.

For example, in a digital photo apparatus, it is possible to have a frame, notably in predetermined form, surrounding the main subject for the purpose of informing the photographer which main subject has been detected by the apparatus during picture-taking. Such indication signal of the main subject can notably be used prior to the actual picture-taking in order to inform the photographer what will be the sharpest subject or object.

Such signal may also be an indication that the closest object or subject is too close-up in relation to the picture-taking apparatus for it to be sharp. In such a case, the signal takes the form, for example, of a clear message "Foreground too close", or of an exaggeration of the foreground blur, or even of a visible alteration of the foreground colour.

The signal indicating that the scene or the object of the foreground is too close-up may take account of the final destination of the image that is to be taken, notably of the resolution selected for such destination. For example, a subject that would be blurred on a television-receiver or computer screen may be sharp on a small-size screen of the type found on a picture-taking apparatus. Likewise, a blurred subject for printing on 24 cm×30 cm paper is not necessarily so for printing on 10 cm×15 cm paper.

The blurred indication signal may also take account of the subject. For example, the detection of a bar code is more tolerant to blur than a natural image.

Example of an alarm signal provided by a picture-taking apparatus:

In a video-surveillance system monitoring an object, the picture-taking apparatus is adjusted to cover two regions. The first of these regions is the one where the object is found, while the second region is the full range of the picture-taking apparatus. If an object within the picture-taking range comes closer to the object to be monitored, an alarm is thus activated.

In an embodiment, the function activated depends upon at least one specification of the capturing apparatus during picture-taking, namely, the focal length, the aperture, the focussing distance, the exposure parameters, the white-balance parameters, the resolution, the compression, or an adjustment made by the user.

Indeed, the function activated depends upon the measured relative sharpness and such relative sharpness between at least two colours depends upon the adjustment of the picture-taking apparatus, namely the focal length, the aperture and the focussing distance.

In an embodiment, the digital image constitutes a raw image stemming from the sensor of the capturing apparatus.

Such function makes the relative sharpness function easier, since when using a raw image, the measurement is not affected by such processes as the demosaicing, the sharpness improvement filter, the change in the colour area or the shade curve.

The raw image stemming from the sensor may, however, have been processed, for example soundproofing, digital gain, compensation of the dark level.

The relative sharpness measurement and/or the function activated may be performed within the capturing apparatus.

The relative sharpness measurement may be performed beyond the capturing apparatus, for example on a computer after transfer of the digital image, and/or the user activates a function beyond the capturing apparatus.

It is indeed possible to take a relative sharpness measurement beyond the capture apparatus; likewise the function can be activated beyond the capturing apparatus, such as already mentioned. For example, a processing programme implemented on a computer determines, using the sharpness measurements, the focussing distance and/or the depth of field in order to implement the processes depending on such distance and/or the depth of field.

In an embodiment, the function comprises a detection and/or recognition function for a part of the image, such as face detection and/or recognition.

For example, it is known that a face represents a given size. The method according to the invention enables to determine the distance between the objects or subjects and on the capturing apparatus. Furthermore, using such distance data, for the focal length and for the size of the object in the image, the existence of the face can be deducted (which represents a size comprised within a given range). The size criterion of the object can be completed by other criteria, like, for example, the colours. Detection of an object, such as the detection of faces, can be especially used, during teleconferences, to automatically perform a high background compression. Such method may also be used for the detection of a defect so as to correct it, of red eyes, or for recognising faces (biometric applications).

In an embodiment, the function activated comprises a position and/or movement measurement of the capturing apparatus.

In an embodiment, one or several objects destined to remain fixed in a scene of captured image shall be stored in the memory, while movement or positioning shall be detected by determining the variation of the relative sharpness over time. Such arrangement can, for example, be used to embody a computer interface of the visual "mouse" type in three dimensions.

In an embodiment, the function activated comprises the determination of the position of the main subject or subjects in the image.

The determining criterion of the main subject within a digital image shall be the shortest distance in relation to the capturing apparatus. Nevertheless, such criterion may be combined with other factors. For example, objects on the edge of the image that would be close to the capturing apparatus, may be eliminated through an automatic process. As previously described, it is also possible to take account of the object's size criterion, such size depending upon the focal length and the distance between the capturing apparatus and the object.

In an embodiment, the function activated further comprises the automatic framing, namely the centring, or the reframing of the digital image and/or of another image on the main subject of the digital image. The reframed image may be the digital image. The reframed image may also be another image, for example an image stemming from the same capturing apparatus and captured after the digital image.

For example, it is possible to provide a "close-up" mode, which automatically ensures a framing on a foreground object. It is also possible to provide a "bust" mode which automatically ensures the framing of a face according to the said three-thirds' rule, for example positioned within a third of the image height and width.

In an embodiment, the function activated comprises the application of a process which, on the one hand, depends upon the relative sharpness and upon the user's selection criterion, on the other.

For example, the criterion selected is as follows: privilege the parts of the image that are the nearest to the capturing apparatus. Thereby, the function may consist of increasing the sharpness of such parts of the image and of reducing the sharpness of the remainder of the image in order to create a depth of field lower than that actually achieved. Under such conditions, it is possible to simulate the behaviour of a lens having variable focussing and aperture within an image achieved using a lens without any functions, whether focussing or aperture, such as in a "cameraphone".

In an embodiment, the function activated comprises alteration of the contrast and/or of the brightness and/or of the colour and/or of the image sharpness, depending on the variation of the relative sharpness within the image.

Hence, it is possible to simulate localised lighting, such as that of a flashlight; it is also possible to reduce the effect of a flashlight, for example, in order to reduce the backlighting or the flat-tint effects.

A scene is lit up by one or several natural or artificial sources, as well as possibly by one (or several) flashlight (or lights) controlled by the apparatus.

It is known that an image-capturing apparatus controls exposure (exposure time, sensor gain and, where necessary, aperture), controls white balance (gain for each colour within the whole image) and possibly controls the flashlight (duration and strength of the flashlight), depending on the measurements in a digital image of the scene (for example, analysis of the saturated zones, analysis of the histogram, analysis of the average colour) and/or controls the measurements taken with a supplementary device: infrared range-finder, pre-flash for the flashlight, etc., focussing servo-control enabling to find the focus produced by the sharpest image by comparing the sharpness of several images taken with varying focuses. Such controls modify the image contrast and/or luminosity and/or colour, though do not use a relative sharpness measurement between at least two colours on at least one region R of the image.

Furthermore, such known processes as the shade curve and the colour rendering modify the image contrast and/or luminosity and/or colour, though do not use a relative sharpness measurement between at least two colours on at least one region R of the image.

Such known methods are limited due to the lack of information on the geometry of the scene. For example, it is difficult to distinguish a naturally dark object from an object poorly lit. As another example, a flashlight is not able to correctly light up several subjects if such subjects are at varying distances.

In an embodiment, the function activated comprises the provision of the position of at least one zone of interest to be considered to a servo-control of exposure and/or of white balance and/or of focussing, such zone of interest being determined by comparing at least two relative sharpness measurements.

For example, the exposure function may be performed on the part nearest to the capturing apparatus, possibly in combination with another criterion, such as elimination of the near object or objects, on the edge of the image (field border).

The servo-control of the white balance may be performed, for example, on a large-scale subject in the centre of the image, possibly to the detriment of a background lit up differently. As a variant, the method consists of determining a close-up part in the image and a far-off part, the white-balance function taking separate measurements on these regions in order to determine the existence or not of several lighting and to perform distinct compensations for each one of these regions.

If the focussing servo-control is given the position of the interest zone, activation of focussing will be faster and the main subject (zone of interest) will be able to be followed, even when travelling.

In an embodiment, the function activated comprises provision of a signal, destined for the user, indicating that the image is taken too close-up to be sharp.

In an embodiment, the function activated comprises an image resolution alteration depending on the measured relative sharpness. The image may be the digital image. The image may also be another image, for example an image stemming from the same capturing apparatus and captured after the digital image.

For example, resolution is reduced when the image is taken at a distance too close-up from the capturing apparatus to achieve a sharp image at full resolution, the final resolution being selected in order to obtain a sharp image.

In an embodiment, the function activated comprises the provision of data, or a signal, used for an automatic indexing of the digital image.

For example, if the image comprises subjects or objects at a distance lower than a given limit and of a size exceeding a threshold, indexing may then consist of providing a signal indicating that it concerns a portrait or a group of persons. The distinction between these two situations shall be made according to whether the imaged scene comprises one or several close-up objects or subjects. If the distance of the objects or subjects exceeds a pre-determined limit, one may then consider that the image represents a landscape.

In an embodiment, the function activated comprises the provision of remote or directional data, in relation to the capturing apparatus, of a subject or an object within the digital image to a sound-capturing device.

Thereby, in a camcorder or a cameraphone, it is possible to determine the main subject or subjects, to determine the distances and/or the directions of these main subjects and to focus the sound capture on the main subject or subjects, thus eliminating the background noise. The directivity function of the sound capture can be performed using two microphones and a de-phasing device between the signals of these microphones.

A particular application of this latest arrangement is, in the case of a video-conference, the use of a wide-angle image-capturing apparatus and an automatic monitoring of the subject in the process of speaking.

In an embodiment, the function activated includes the parametering of increased compression for the background and of a compression for the main subject or subjects, such main subject or subjects being determined as constituting an image zone complying with the criteria based upon the measured relative sharpness.

Thereby, in the case of a video-conference, for example, the output can be minimised, while maintaining a satisfactory visibility of the main subject. The latter is determined as constituting the part of the image the nearest to the picture-taking apparatus and determined differently, as described in this application.

In an embodiment, the capturing apparatus comprises a sensor having pixels equipped with coloured filters of at least two types, such filters being selected so that their spectral responses entail little overlapping.

Under such conditions, the sharpness between two colours can be maximised, thus optimising the precision of the relative sharpness measurement.

In an embodiment, the capturing apparatus comprises a sensor having pixels mainly serving to produce the image, and other pixels mainly serving to measure the relative sharpness.

In an embodiment, the pixels mainly serving to measure the relative sharpness have a spectral response within a spectral band, which entails little overlapping with the spectral band of the pixels mainly serving to produce the image.

In an embodiment, the pixels mainly serving to produce the image have a spectral response mainly within the field visible to the human eye, and the other pixels have a spectral response mainly beyond the field visible to the human eye.

The invention also concerns a sensor thus defined, separate from a capturing apparatus and from the method according to the invention, as defined above.

The invention also concerns a capturing apparatus comprising such a sensor, such capturing apparatus also being able to be used separately from the method defined above.

The invention also concerns, according to an arrangement which may be used in combination with (or separately from) the arrangements defined above, a digital image-capturing apparatus comprising a sensor representing, on the one hand, pixels whose spectral response is mainly within the field visible to the human eye, and additional pixels having a spectral response mainly beyond the spectre visible to the human eye, on the other, such sensor being such that the part of the image stemming from these additional pixels represents a sharpness, within at least one range of distances between the capturing apparatus and the imaged scene, that exceeds the sharpness of the part of the image stemming from the pixels whose spectral response is mainly within the visible field.

The additional pixels may be sensitive to the infrared and/or ultraviolet rays. The pixels sensitive to ultraviolet rays may serve to improve the sharpness for short distances, whereas the pixels sensitive to infrared rays may serve to improve the sharpness for greater distances. By infrared and/or ultraviolet is meant all parts of the spectre beyond or below the visible spectre, notably the near infrared, such as 700 to 800 or 700 to 900 nm, or the near ultraviolet, near by 400 nm.

In an embodiment, the capturing apparatus is equipped with a fixed lens, i.e. lacking mechanical elements for focussing.

Under these conditions, focussing can be digitally processed.

In an embodiment, the capturing apparatus is equipped with a lens with a variable focal length without a mobile or flexible focussing element, the relative sharpness between at least two colours on at least one region R of the image being variable according to the focal length and/or the position of the imaged object in relation to the apparatus.

Thereby, a device equipped with a simpler zoom is obtained, enabling to reduce the size and the cost, and to increase reliability.

The lens with a variable focal length comprises, for example, a single optical mobile or flexible unit.

It is known that a zoom is embodied with at least two mobile units, for example one or two for the focal length and the other for the focussing. Generally-speaking, the focussing and the focal length are separate from each other, i.e. when the focal length varies, it is not necessary to alter the focussing. This eliminates the time necessary for focussing. There also exist lenses with variable focal lengths, called varifocals, less costly, in which the focussing must be altered when the focal length varies. Finally, there exist afocal zooms in which two mobile optical units, linked in a complex manner, are used for the purpose of varying the focal length, with focussing being embodied by a third unit.

In an embodiment, the digital image stems from at least two sensors.

For example, each sensor is dedicated to a given colour. It is possible, for example, to use a sensor of the tri-CCD type with a common imaging lens on these sensors.

In an embodiment, the function activated comprises the addition of an object inside an image and/or the replacement of a part of an image depending on the measured relative sharpness on the digital image.

For example, the method enables to add a person next to the main subject. As an example, it is also possible to add an object at a given position within an image; such object will have the right size within the image if one is to take account of the distance from the imaged scene up to such position.

It is also possible to alter the background or even to black it out.

It is also possible to extract a part of the image, such as the main subject, and to insert it in another image, whether of the natural or synthesis type, for example in the context of a game.

It is also possible to add publicity data at a given point and at a fixed distance from the scene, for example, behind the main subject.

In an embodiment, the method comprises the capture of a sequence of images, the digital image being a part of the sequence and the function activated being on at least one other image of the sequence.

Hence, as already described, the estimation of the relative sharpness can be taken on images of pre-visualisation prior to picture-taking at a lower resolution, while the correction can be made on an image already memorised, for example by using a selection of filters resulting from a measurement taken from the images of pre-visualisation.

In an embodiment, the function activated comprises the alteration of one adjustment of the capturing apparatus, namely the focal length, the aperture, the distance for focussing.

Thereby, the picture-taking apparatus may comprise an automatic adjustment programme, such as the aperture being increased if the main subject is situated in front of a background, such background thus becoming blurred. The adjustment programme may also automatically adapt the aperture to the distance of the subjects of a group so that the depth of field is adequate enough to make all the subjects in the group sharp. It is also to be noted that in such a case, a function is automatically achieved, whereas in the state of the art, it is achieved manually.

In an embodiment, the function activated comprises the production of an altered raw image.

The digital image is preferably the raw image from the sensor prior to "demosaicing" (i.e. removing the matrix). The digital image may also have been processed, for example, undergoing a white balancing. The digital image shall preferably not have undergone sub-sampling.

Hence, an optical system, sensor and image-processing means' unit is obtained, thereby producing a raw image representing a better quality or with specific characteristics, for example, an extension of the depth of field, while maintaining similar characteristics to that of a raw image directly stemming from the sensor, and particularly a compatibility with the known functional blocks or components performing the function of converting a raw image into a visible image ("image pipe" or "image signal processor"). As a variant, the raw image undergoes demosaicing.

In an embodiment, the lens of the capturing apparatus represents high longitudinal chromatic aberrations, for example, such as for a given focussing, aperture and focal length, there exists at least one colour for which the distance involving the best sharpness is lower than $$k \frac{f^2}{O.P},$$

k being a coefficient lower than 0.7, preferably lower than 0.5, f being the focal distance, O being the aperture and P having the smallest (among all colours of the image) diameter of the blur spot of an object point situated in infinity.

In an embodiment, the measurement of relative sharpness between two colours is achieved by comparing the results of a first measurement M applied to the first colour and the results of a second measurement applied to a second colour, each measurement M providing a value function for, on the one hand, sharpness and colour, and for the contents of the digital image on the other, thus removing the comparison from the digital image contents.

A Definition and Embodiment Example for a Relative Sharpness Measurement:

The comparison of sharpness is performed using a measurement M on the pixels of the digital image.

The measurement M in a given pixel P, for a channel of a given colour C corresponds to the gradient of the variation of C within the P vicinity. It is obtained via the following calculation:

For a given colour C, V(P) is considered as a vicinity of pixel P.

GM is noted as being the average of the amplitude of the gradients within the vicinity V(P), and SM as being the average of the amplitude of the differences between GM and the gradients within the vicinity V(P).

A gradient is calculated through the amplitude of the difference in the values of two pixels of a same colour. The gradients within the vicinity V(P) correspond to the gradients implicating a pre-determined number of pixel couples within the vicinity V(P).

The measurement M to the pixel P having a colour C can be defined by the ratio between SM and GM. Thus, a value M (P, C) is obtained.

Such measurement does not itself enable to precisely and completely characterise the sharpness of the colour C. Indeed, it depends on the contents of the image (type of imaged scene=texture, gradation, etc.) within the vicinity V(P) of the pixel P. A frank transition in the imaged scene for a same colour sharpness, will generate a higher measurement M than a soft transition within the imaged scene. On natural images, a transition will exist in the same manner in each colour, thus affecting the measurement M in the same manner among the colours. In other words, when a frank transition appears on a colour C, the same type of transition appears on the other colours.

Thereby, the comparison of the measurements M enables to establish the relative sharpness between a colour C1 and a colour C2.

The relative sharpness, between two colours C1 and C2, measured in a pixel P can be defined, for example, as a comparison between the two measurements M(P,C1) and M(P,C2). Thus M(P,C1)>M(P,C2) implies that C1 is sharper than C2.

It is also possible, for example, to use one of the following formulas:

M(P,C1)−M(P,C2),

M(P,C1)/M(P,C2),

Or any other function F(M(P,C1), M(P,C2) adapted to the comparison between the two measurements.

The relative sharpness in a region R of the image can be defined by using a measurement M on all the pixels P of the region R.

The relative sharpness in a region R of the image can be the whole range or a sub-range of the relative sharpness measured for pixels P of the region R. It may also be defined as a unique value, such as the sum S of the measurements on all the pixels P of the region R for each one of the colours. Thereby, for two colours, C1 and C2, it is possible, for example, to consider that S(C1)>S(C2) implies that C1 is on average sharper than C2 in the region R.

It is also possible to use any other function G(S(C1), S(C2)) enabling the comparison between these two measurements.

In an embodiment, when the function activated consists of determining the position of the main subject within the image, the function activated further comprises the automatic framing, namely the centring of the image on the main subject.

The method may be implemented inside an image-capturing or processing apparatus or device. Such apparatuses or devices are included within the group comprising: an electronic component, integral or not with a sensor, an electronic sub-unit with integrated lens, a sensor and possibly an image-processing module ("camera module"), or any other form as defined above.

Figure 3A:
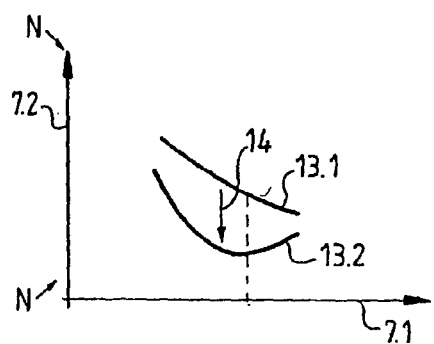
Figure 3B:
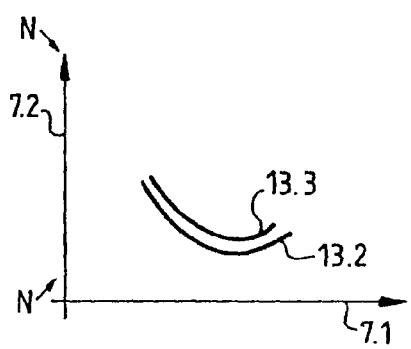
Figure 4:
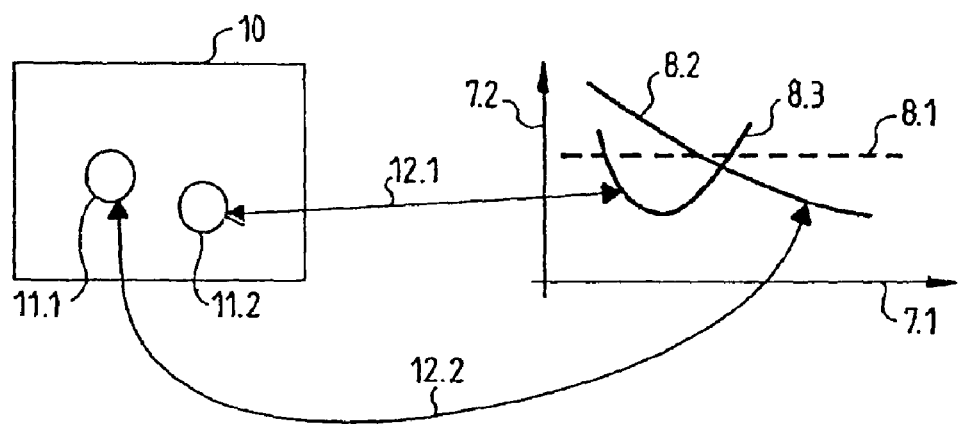
Figure 5:
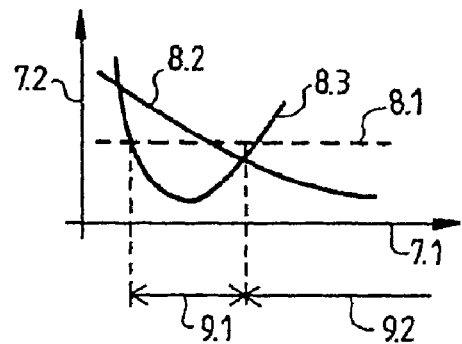
Figure 6:
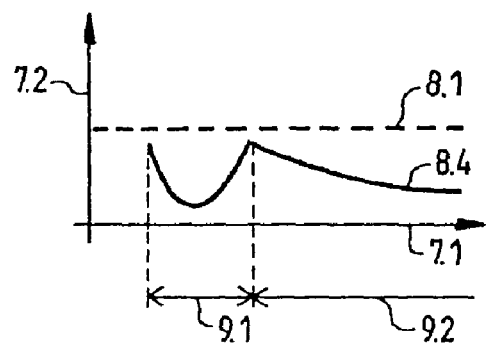
Figure 7:
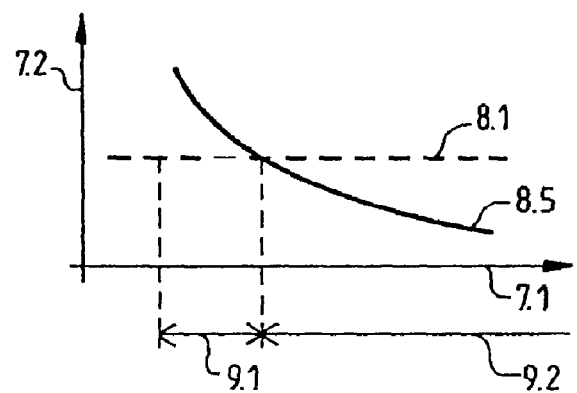
Figure 8:
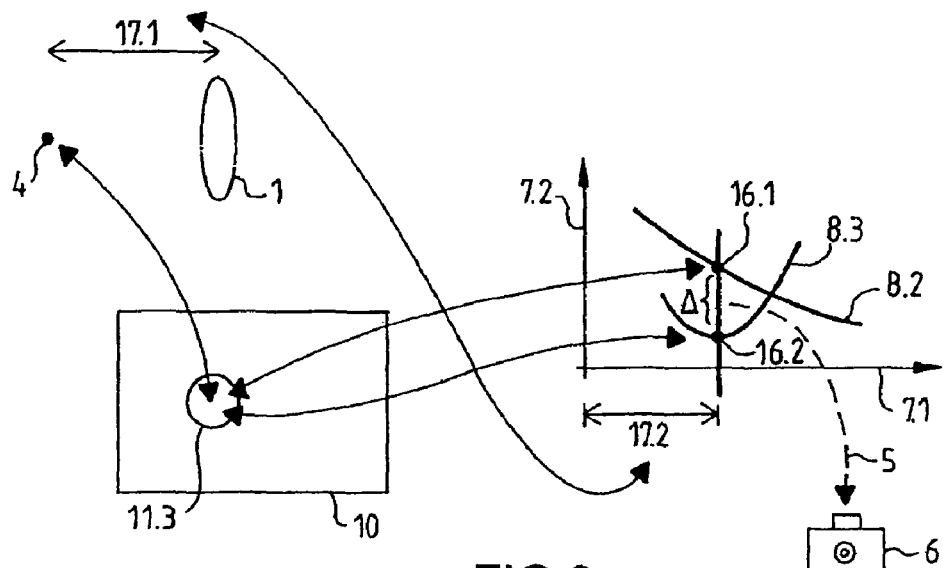
Figure 9:
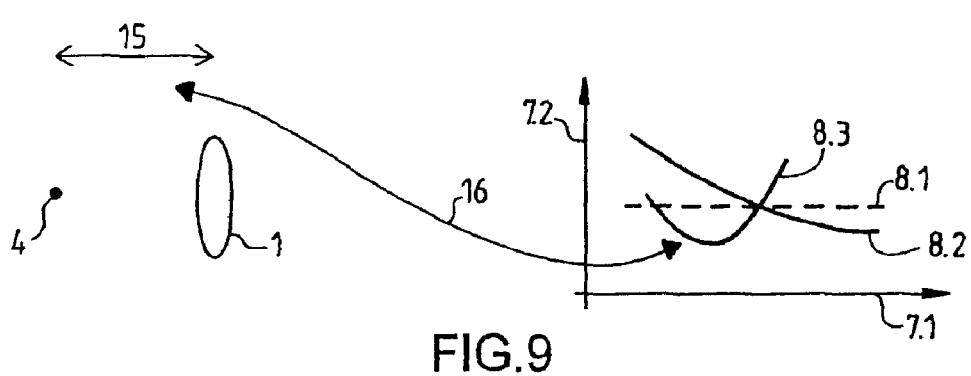
Figure 10:
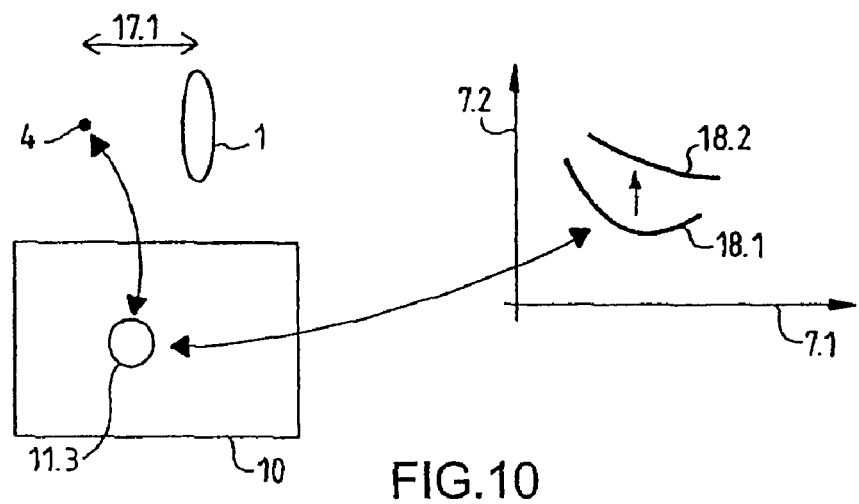
Figure 11:
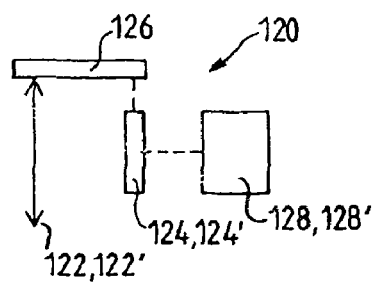
Figure 12:
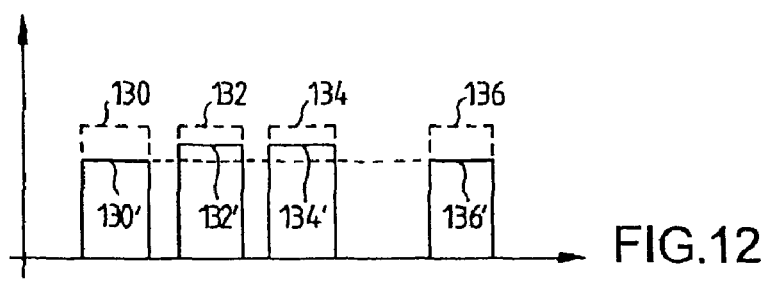
Figure 13:
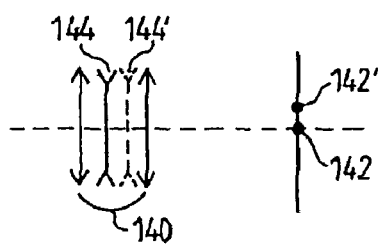
Figure 14A:
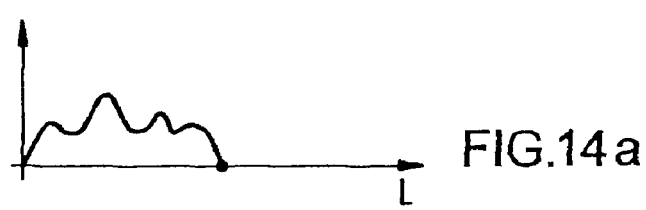
Figure 14B:
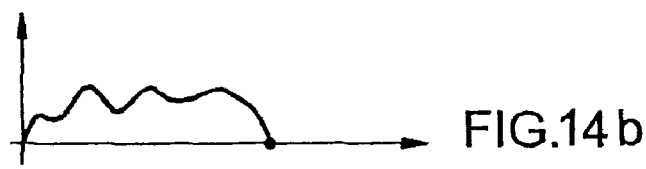
Figure 15:
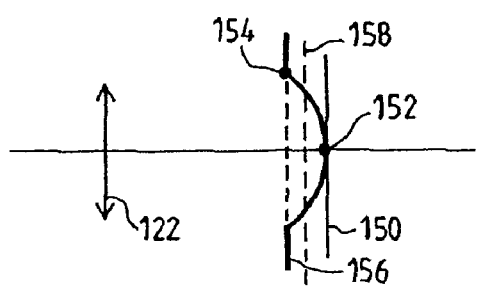
Figure 15A:
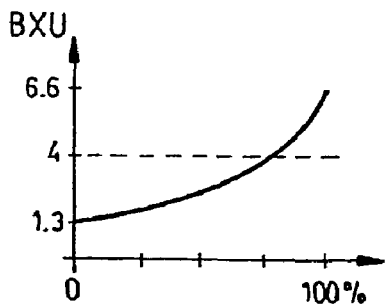
Figure 15B:
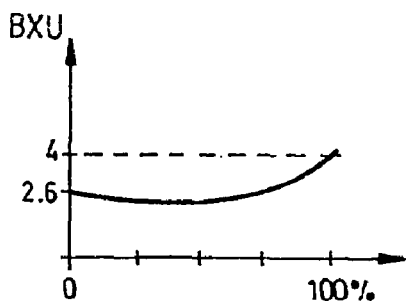
Figure 16A:
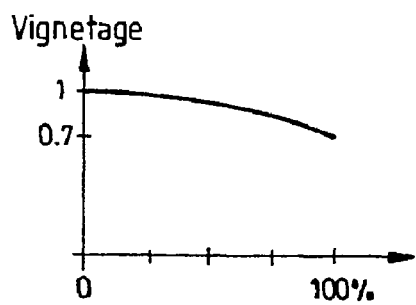
Figure 16B:
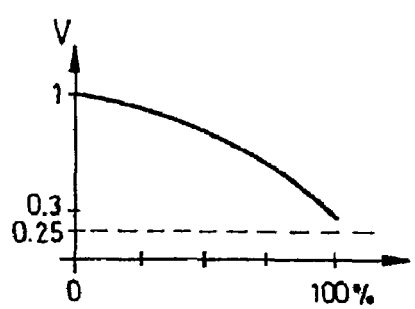
Figure 16C:
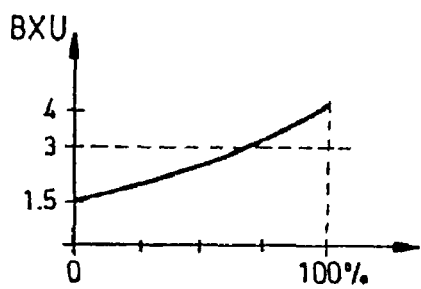
Figure 16D:
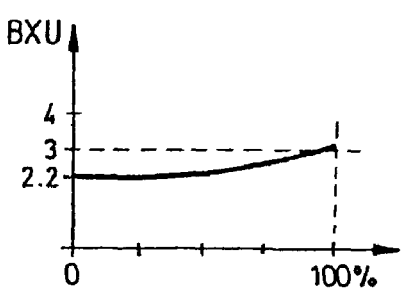
Figure 17A:
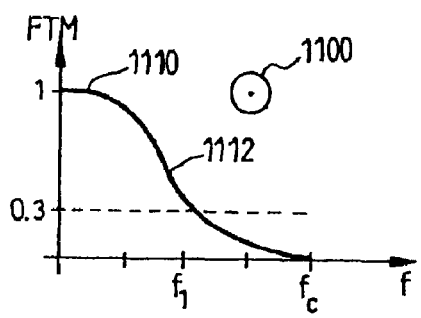
Figure 17B:
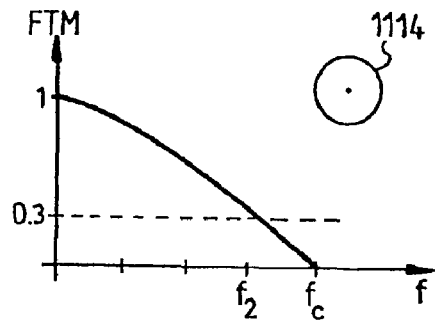

Other specifications and advantages of the invention will be shown in the description of some of its embodiments, such description being backed up by sketches appended hereto, whereupon:

FIGS. 1a and 1b, already described, are explanatory diagrams of the longitudinal chromatic aberration of a converging lens, FIG. 2, already described, is the colour spectral diagram of an image, FIGS. 3a and 3b are diagrams showing the improvement of a colour's sharpness using a same sharp colour in accordance with the invention, FIG. 4 is a diagram showing the improvement of a colour's sharpness using different sharp colours linked to distinct regions of an image in accordance with the invention, FIGS. 5, 6 and 7 are diagrams showing the improvement of a colour's sharpness using different sharp colours linked to the whole part of an image in accordance with the invention, FIG. 8 is a diagram showing the servo-control of an apparatus according to a difference in the sharpness between the sharp colour and the colour to be improved in accordance with the invention, FIG. 9 is a diagram showing the selection of a sharp colour using a distance measured between an object and an apparatus capturing the image of such object, FIG. 10 is a diagram showing the reduction in the sharpness of at least one colour within at least one region of the image, FIG. 11 is a sketch of an apparatus obtained by the method according to the invention, FIG. 12 is a diagram showing the steps of the method according to the invention, FIG. 13 shows an adjustment mode in compliance with the invention, FIGS. 14a and 14b are a series of diagrams showing the adjustments used in the context of the invention, FIGS. 15, 15a and 15b illustrate a property of an image-capturing apparatus according to the invention and of a conventional apparatus, FIGS. 16a to 16d are diagrams showing the properties of an optical system of an apparatus according to the invention and of a standard apparatus, FIGS. 17a and 17b are sketches showing a selection example of an optical system for an apparatus in accordance with the invention, FIG. 18 is a diagram illustrating the specifications of a picture-taking apparatus according to the invention, FIGS. 18.1 and 18.2 show the means for implementation of the method according to the invention, FIGS. 19.1, 19.2 and 19.3 show the steps of the method in accordance with the invention, according to several embodiment variants, and FIGS. 20.1 and 20.2 show other embodiments of the invention.

In accordance with the invention, the method described below improves the sharpness of at least one colour of a digital image by selecting from among the image's colours at least one colour referred to as "sharp colour" and by reflecting the sharpness of the sharp colour onto at least one other improved colour, as shown below using FIGS. 3a and 3b.

More precisely, FIG. 3a shows the sharpness (Y-axis 7.2) of two colours 13.1 and 13.2 depending on the distance of the objects that they represent in the considered image in relation to the apparatus having captured the image (axis 7.1 of the abscissa).

As previously explained, the sharpness of these two colours varies in a different manner depending on such distance, although basically in this example, the first colour 13.2 represents a better sharpness than that of the second colour 13.1 of this same image.

Hence, according to the method complying with the invention, the sharpness of the first colour 13.2 is reflected in order to achieve the improvement 14 of the sharpness of the second colour 13.1 which represents, after such improvement, an increased sharpness 13.3.

In such example, CA, CO and CN are respectively values representing the improved colour, the original colour (or colour to be improved) and the sharp colour. In this example, the sharp colour is the first colour. The original colour and the improved colour correspond to the second colour prior and subsequent to processing.

The sharpness is reflected onto the second colour by using a filter F, according to a formula of the type:

$$CA=CN+F(CO-CN)$$

Typically, the filter F will demonstrate the particularity of removing the details from the image on which it is being applied. In order to do so, a linear low-pass filter (or averager) could be used. It is also possible to use one of the numerous known non-linear filters having the particularity of removing the details, like, for example, a median filter.

At this stage, it is essential to recall that the human retina is particularly sensitive, in relation to the details of an image, to the colour green; hence, the adjustment of optical systems generally aims at achieving extreme sharpness for this colour with regard to a certain focussing range (cf. for example, pages 30 to 33 of the article, "Color Appearance Models" by Mark D. Fairchild edited by Addison Wesley).

Hence, according to an observation concerning the invention, an optical device producing images whose sharpness is not satisfactory to the human eye can represent a satisfactory sharpness for one of its colours, such as the blue or the red, to which the eye is less sensitive when considering detail.

Typically, for a long-range focussing lens (hyperfocal), when considering an image representing a close-up object and a far-off object, the sharpness of the far-off object generally appears enhanced with a green colour, while the sharpness of the close-up object is improved when considering the blue colour.

It thus appears important to be able to improve the regions of an image according to different sharp colours depending on the relative sharpness between two colours.

Thereby, in an embodiment of the invention, the sharp colour serving to improve the sharpness of a colour depending on the image's region shall be selected, such method being described below by way of FIG. 4 which illustrates an image 10 comprising two regions 11.1 and 11.2.

In these two regions, two colours 8.2 and 8.3 can be found. Nevertheless, the sharpness (Y-axis 7.2) of these colours is such that in the region 11.1, the colour 8.2 is the sharpest, while in the region 11.2, the colour 8.3 is the sharpest.

Henceforth, a colour in the region 11.2 is improved by considering the colour 8.3 as the sharp colour, while a colour in the region 11.1 is improved by considering the colour 8.2 as the sharp colour.

At this stage, it should be noted that the regions of an image may or may not be pre-determined. For example, in the case of a digital image made of pixels, a region may be a spatial zone delimited by one or several pixels.

Furthermore, it is possible to select a sharp colour in order to improve another colour by simply comparing the sharpness of one colour in relation to the others, though at least one other, regardless of any notion of distance, such as that represented by axis 7.1.

In this case, such an analysis is represented, for example, as a table:

| Zone | 11.1 | 11.2 |
|---|---|---|
| Sharpness | 8.2 > 8.3 | 8.3 > 8.2 |

In this case, the colour 8.2 is selected as the sharp colour in the region 11.1, while the colour 8.3 is the sharp colour in the zone 11.2.

Irrespective of the use of regions in an image, it can be advantageous to consider various sharp colours in order to improve a colour in an image, as described below using FIGS. 5, 6 and 7.

More precisely, the diagram in FIG. 5 shows the sharpness (Y-axis 7.2) of two colours 8.2 and 8.3 depending on the distance (7.1) between at least one object of the captured scene for obtaining the said image and the capturing apparatus.

It seems that on the range 9.1, the colour 8.3 represents increased sharpness compared with that of the colour 8.2, whereas for larger distances (range 9.2), the opposite situation arises.

In such a case, a method complying with the invention may consider colour 8.3 as the sharp colour, serving to correct the sharpness of a colour, within the range of distances 9.1, whereas within the range 9.2, the colour 8.2 is considered as the sharp colour in order to improve a colour stemming from an object of the captured scene for the purpose of obtaining the image situated at a distance from the capturing apparatus.

Following such corrections, the sharpness of the colours on the image can be improved in the direction of a profile, such as shown in diagram 6, namely the juxtaposition of the sharpest colours in the image.

It is clear that, in a similar manner to the description in FIG. 4, it is possible to select a sharp colour in order to improve another colour by simply comparing the sharpness of one colour in relation to the others, though at least one other, regardless of any notion of distance, such as that represented by axis 7.1.

The sharpness curves represented in the figures already described 3a, 3b, 4, 5 and 6, and subsequently described in 7 to 10, can vary according to the geometric position of the region considered of the image and/or of other image-capturing parameters, such as the focal length, the aperture, focussing, etc.

In order to determine the sharpest colour within the meaning of the invention, there is no need to be aware of the parameters indicated above.

In the other cases, and notably for determining the distance according to the invention and/or for controlling the depth of field, it is necessary to be aware of some of the parameters, as well as of the sharpness curves, at least partially or approximately for some values of such parameters.

Furthermore, the choice of the sharp colour can also be determined by the software activation of at least one image-capturing mode, such as a macro mode, as described hereunder. In such a context, the image may be considered as a sole region.

It should be noted that in these FIGS. 5 and 6, a threshold 8.1 is represented indicating the level of sharpness required, and above which the image is considered as blurred.

In standard processing, shown in FIG. 7, such a threshold 8.1 defines the depth of field, i.e. the range 9.2 of distances between at least one object of the captured scene for obtaining the said image and the capturing apparatus, such that the image of the object is sharp.

A consequence of the invention is thus to enable an extension of the depth of field of an optical system, as detailed below by way of FIG. 9. In this figure, the depth of field of a capturing apparatus, initially limited by the sharpness of the colour 8.2 and the sharpness threshold 8.1, is increased by using a second colour 8.3 representing a satisfactory sharpness (below threshold 8.1) on a new range of distances between at least one object of the captured scene for obtaining the said image and the capturing apparatus.

Concretely, such an application is implemented in fixed-focus photographic apparatus, such as cameraphones. Indeed, the optical conception of these apparatus allows for a sharpness range for long distances, up to several tens of centimeters at the best, on the basis of a green colour, similar to the colour 8.2 of FIG. 5.

Furthermore, the blue colour not focussing in the same manner, it can represent sharpness at shorter distances where the green colour may not, similarly to the colour 8.3.

Henceforth, the invention enables to increase the sharpness of a close-up image of a cameraphone by attributing the sharpness of the blue colour to the green colour, and to the other colours, consequently increasing the depth of field of the apparatus.

In an embodiment of the invention, shown by way of FIG. 8, more especially adapted to a capturing apparatus equipped with an autofocus function, the method determines a servo-control instruction for the considered capturing apparatus using the sharpness of at least two colours of the captured image, in such a manner that focussing is achieved in fewer steps and thus more rapidly.

For example, a distance 17.1, between at least an object of the imaged scene and the optical system 1 capturing the image, may be determined using the various levels of sharpness (Y-axis 7.2) of the colours 8.2 and 8.3 used in the region 11.3 relating to the image of the object.

Knowing such a distance between the object 4 and the system 1, it is thus possible to determine a servo-control instruction 5 for the capturing apparatus 6. Such FIG. 8 shall be described below in more detail.

According to another embodiment of the invention, shown by way of FIG. 10, the sharpness is reduced by at least one colour in at least one region of the image.

Macro Application

We are now going to describe, by referring to FIGS. 5, 6 and 7, an embodiment and system according to the invention, more especially adapted to the embodiment of a Macro function without requiring a specific mechanical device for a known image-capturing apparatus. A macro function is destined to enable the image embodiment of objects close to the capturing apparatus within a pre-determined range of distances, called range of macro distances 9.1, on the apparatus. Usually, a capturing apparatus enables to move all or part of the lens in order to embody the macro function. The method or object system of the invention enables to do away with such movement.

According to the invention, the sharpest colour for the range of macro distances 9.1 shall be pre-determined, for example, through the measurement of the sharpness 8.2 and 8.3 of the colours of the digital images obtained by the capturing apparatus for each colour, by embodying the digital images using objects located at different distances from the capturing apparatus. The sharpest colour (FIG. 5) is the one corresponding to the measurement 8.3. Such pre-determination can be embodied definitively, for example, when designing the apparatus (or a series of apparatus).

Thereafter, when using the apparatus, upon activation of the Macro function, the sharpness of the sharp colour thus determined shall be reflected onto the other colours, as described above. When the Macro function is not activated, the sharpness of the digital image can be calculated by a standard method or by using the method according to the invention, as applied to the range of distances 9.2.

Thereby, a macro function is achieved, compatible with a fixed focussing lens without any mobile mechanism, thus not altering the overall dimensions of the image-capturing apparatus, nor adding hardware costs. The macro mode may thus be activated via software within the apparatus or within any other image-processing device. Such software activation may be performed in a standard manner prior to image capture, but also after such capture and on a local or remote device of the capturing apparatus. According to a variant, activation of the macro mode may be done automatically, for example by determining the sharpest image between the image generated in normal mode and the image generated in macro mode.

The macro function embodied according to the invention is also beneficial to an apparatus comprising variable parameters when capturing the digital image and having an influence on the sharpness of the colours, notably a capturing apparatus with a zoom, and/or a lens with variable focussing and/or a variable aperture. Thus, the sharpness curves 8.2 and 8.3 shall be used, corresponding to the value of the variable parameters according to the digital image.

The addition of the macro function enables to take shots of bar codes, business cards or handwriting containing text and/or sketches, by using an image-capturing apparatus, notably a telephone or a photo apparatus.

Depth of Field Extension Application

We are now going to describe, by referring to FIGS. 4, 5, 6 and 7, an embodiment and system according to the invention, more especially adapted to the extension of the depth of field without requiring a specific mechanical device for a known image-capturing apparatus. The depth of field corresponds to the range of distances, between the objects of the scene and the image-capturing apparatus, enabling to obtain a sharp digital image. Usually, a capturing apparatus has a limited depth of field and the lower it is, the greater the lens aperture.

According to the invention and as represented in FIG. 4, the digital image is decomposed into regions 11.1 and 11.2, for example, into square regions corresponding to 9 sensitive elements next to the sensor or, more generally, into regions corresponding to X by Y sensitive elements or into regions of a pre-determined shape or calculated according to the digital image. For each region shall be selected the sharpest colour, for example, like the colour corresponding to the lowest value among the values obtained by calculating a gradient for each colour using grey levels corresponding to the colour and the region considered. In FIG. 4, the colour corresponding to the curve 8.3 is sharper for the region 11.2, while the colour corresponding to the curve 8.2 is sharper for the region 11.1.

Thereby, for each region, the sharpness of the sharp colour thus selected is reflected onto the other colours.

By referring to FIG. 5, the digital image of close objects—having a distance 5 on the capturing apparatus within the range of distances 9.1—can be seen as being sharp for the colour corresponding to the curve 8.3 (for example the blue colour), while it is less so for the colour corresponding to the curve 8.2 (for example the green). It is also possible to see that the digital image of far-off objects—having distances on the capturing apparatus comprised within the range of distances 9.2—is sharp for the colour corresponding to the curve 8.2, while it is less so for the colour corresponding to the curve 8.3. The eye being much more sensitive to sharpness within the green than within the blue, it will perceive a sharpness corresponding to the curve 8.5 of FIG. 7. If 8.1 corresponds to the threshold of sharpness for the eye, the image will only be sharp for the objects located at a distance from the capturing apparatus comprised within the range 9.2. FIG. 6 represents, via the curve 8.4, the sharpness obtained in each colour after employing the method according to the invention: the blue has enabled to obtain a better sharpness than the threshold 8.1 for the near objects, located in the range of distances 9.1, whereas the green has enabled to obtain a better sharpness than the threshold 8.1 for the distant objects, located in the range of distances 9.2. Hence, a sharp digital image is achieved for all the colours within a large range of depth of field.

This is an example consisting of selecting the sharpest colour according to a pre-determined rule, namely choosing the sharpest colour in each region.

Thereby, the depth of field is increased without increasing the cost, the complexity or the overall dimensions of the optics and/or with no need to change the exposure, thus to reduce the aperture, to increase the noise level or to increase the movement blur.

The increase in the depth of field embodied according to the invention is notably beneficial to the fixed lenses, namely to telephones. The increase in the depth of field enables to take not only shots of bar codes, business cards or handwriting containing text and/or sketches, but also of portraits or landscapes, by using an image-capturing apparatus, notably a telephone or a photo apparatus. This is possible without using the costly autofocus or macro functions. Furthermore, this function, compared with a mechanical macro function, is achieved entirely automatically without intervention by the user.

The increase in the depth of field embodied according to the invention is also beneficial to an apparatus comprising variable parameters when capturing the digital image and having an influence on the sharpness of the colours, notably a capturing apparatus with a zoom, and/or a lens with variable focussing and/or a variable aperture. Thus, the sharpness curves 8.2 and 8.3 shall be used, corresponding to the value of the variable parameters according to the digital image.

The method and function according to the invention thus enables to select or design, as subsequently described by way of FIGS. 11 to 17b, at the time of the capturing apparatus being designed, a lens with a more limited number of focussing positions, which has the advantage of reducing the lens-design constraints and thus of reducing the costs thereon. This also has the advantage of allowing faster and less-costly focussing by reducing the precision required for the servo-control mechanism.

For example, in order to obtain a large depth-of-field lens, it is possible to choose or design a lens having the specification of being equipped with the broadest union of sharp-distance ranges for each one of the colours.

For example, in order to obtain a large aperture lens, it is possible to choose or design a lens having the specification of being equipped with a single sharp colour within each one of the ranges of distances, and such that the union of sharp-distance ranges for each one of the colours corresponds to the depth of field desired.

In another example, it is also possible to optimise both the aperture of the apparatus and the image's depth of field.

A method and a function are also achieved enabling to reduce the longitudinal chromatic aberrations of a digital image.

A method and function is also obtained enabling to increase the sharpness of an image without knowing which capturing apparatus was used to produce it.

Application on the Distance Measurement for Objects of a Scene Using a Single Image We are now going to describe, by referring to FIG. 8, an embodiment and system according to the invention, more especially adapted to measuring the distance of the objects of a scene using a single image without requiring a range-finding hardware measuring device. The method thus enables to obtain an estimation of the distance of the objects present in each region of the digital image.

Usually, a capturing apparatus uses a hardware device for measuring the distance of the objects of a scene based on a laser, an infrared or a pre-flash mechanism, amongst others.

According to the invention and as represented in FIG. 8, the digital image is decomposed into regions 11.3, for example, into square regions corresponding to 9 sensitive elements next to the sensor or, more generally, into regions corresponding to X by Y sensitive elements or into regions of a pre-determined shape or calculated according to the digital image. Thereby, for each region 11.3, the sharpness of at least two colours is measured; such measured values or measured relative values 16.1 and 16.2 are reported onto the corresponding sharpness curves 8.2 and 8.3 of the capturing apparatus. Hence, a distance 17.2 is obtained, corresponding to an estimation of the distance 17.1 between the part of the object 4, represented in the region 11.3, and the capturing apparatus.

The distance measurement embodied according to the invention is notably beneficial to the fixed lenses, namely to telephones.

The distance measurement embodied according to the invention is also beneficial to an apparatus comprising variable parameters when capturing the digital image and having an influence on the sharpness of the colours, notably a capturing apparatus with a zoom, and/or a lens with variable focussing and/or a variable aperture. Thus, the sharpness curves 8.2 and 8.3 shall be used, corresponding to the value of the variable parameters according to the digital image.

The method thus enables to obtain an estimation of the distance of the objects present in each region of the digital image. This enables:

to build a real-time and low-cost range-finder device by way of a sensor and of a standard lens which produces an image and the remote data correlated to the image; usually, several shots are necessary or a specific hardware device is required and the association image/remote data is complex;

for example, the distance is displayed in real-time on the image, for example, the remote data enables to guide a robot, to accelerate the focussing of capturing apparatuses with variable focussing or focal lengths: it is indeed possible to determine, using a single image, the servo-control instructions to be applied in order to obtain the desired focussing, for example on the central subject or in a focussing zone selected by the user, to take account of the distance of the various objects of a scene in order to adjust the strength of a flashlight and notably of the main subject or of the subject in the focussing zone, to take account of the distance of the various objects of a scene for the auto-exposure function of the capturing apparatus, in order, for example, to enhance the main subject or the subject in the focussing zone selected by the user for a portrait, to automatically define the main subject without having to ask the user to define it.

Application on the Depth of Field Control, Irrespective of the Exposure,

We are now going to describe, by referring to FIGS. 4, 5, 6 and 7, an embodiment and system according to the invention, more especially adapted to the control of the depth of field without requiring a specific mechanical device for a known image-capturing apparatus. The method thus enables to obtain a sharp image for objects situated away from the capturing apparatus, corresponding to a range of sharpness and a blurred image for the other objects. Usually, a capturing apparatus has a limited depth of field and the lower it is, the greater the lens aperture; hence, the depth of field and the exposure are linked in such a manner that a choice has to be made when in low lighting between depth of field, noise and movement blur. According to the embodiment, it is possible to separately control exposure and depth of field.

According to the invention and as represented in FIG. 4, the digital image is decomposed into regions 11.1 and 11.2, for example, into square regions corresponding to 9 sensitive elements next to the sensor or, more generally, into regions corresponding to X by Y sensitive elements or into regions of a pre-determined shape or calculated according to the digital image. For each region shall be selected the sharpest colour, for example, like the colour corresponding to the lowest value among the values obtained by calculating a gradient for each colour using grey levels corresponding to the colour and the region considered. In FIG. 4, the colour corresponding to the curve 8.2 is sharper for the region 11.2, while the colour corresponding to the curve 8.3 is sharper for the region 11.1.

Thereby, for each region, the sharpness of the sharp colour thus selected is reflected onto the other colours, as previously described. As seen above, a sharp digital image is thus obtained for all the colours in a large range of depth of field.

In order to determine the distance between the capturing apparatus and the objects of the captured scene in the region of the digital image, shall be used:

either, as previously described, the sharpness of at least two colours for each region, or another more precise distance-measuring method or device.

Thereby, it is possible to reduce the sharpness, for example, using a Gaussian filter, or using a filter simulating a bokeh, in the regions and/or in the parts of the field containing the objects located at distances beyond the range of desired sharpness. For example, for a portrait, a blurred background can be obtained, thus enhancing the face without requiring a wide-aperture lens. For example, for a landscape, a vast depth of field can be obtained, except possibly for isolated objects in the corners, which may hinder comprehension of the image. For example, for a scene comprising close-up objects in the corner as a result of poor framing, such close-up objects can be blurred. For example, the choice of the depth of field can be left to the discretion of the user, either within the apparatus or on a computer during post-processing.

Thereby, the depth of field is controlled without needing to change exposure, thus without altering the aperture, nor increasing the noise level or increasing the movement blur.

The control of the depth of field embodied according to the invention is notably beneficial to the fixed lenses, namely to telephones. The control of the depth of field enables to take not only shots of bar codes, business cards or handwriting containing text and/or sketches, but also of portraits or landscapes, by using an image-capturing apparatus, notably a telephone or a photo apparatus. This is possible without using the costly wide-aperture lens device. Furthermore, this function can be achieved entirely automatically without intervention by the user.

The control of the depth of field embodied according to the invention is notably beneficial to an apparatus comprising a mobile lens, notably a zoom. A well-informed connoisseur can thus directly or indirectly take control, irrespective of the depth of field and the exposure.

FIG. 11 is a sketch illustrating the architecture of an image-capturing or reproducing apparatus.

Such an apparatus, for example, for capturing images, comprises, on the one hand, an optical system 122, notably with one or several optical elements, such as lenses, destined to form an image on a sensor 124.

Although the examples mainly concern a sensor 124 of the electronic type, such sensor may be of another type, for example, a photographic film in the case of an apparatus known as "argentic".

Such an apparatus also comprises a servo-control system 126 acting on the optical system 122 and/or on the sensor 124 in order to perform focussing so that the image plane is captured on the sensor 124, and/or so that the quantity of light received on the sensor is optimal due to adjustment of the exposure and/or aperture time, and/or so that the colours obtained are correct, by performing a white-balance servo-control.

Finally, the apparatus comprises digital image-processing means 128.

As a variant, such digital image-processing means are separate from the apparatus 120. It is also possible to plan a part of the image-processing means within the apparatus 120 and a part outside the apparatus 120.

The digital processing of the image is performed after image-recording by the sensor 124.

An image-reproducing apparatus represents a similar structure to an image-capturing apparatus. Instead of sensor 124, an image-generator 124' is provided, thus receiving the images from digital image-processing means 128' and providing the images to an optical system 122', such as an optical projection system.

In the next part, when mentioning clarity of exposure, only image-capturing apparatus are being referred to.

According to one of its aspects, which may be used separately from the aspects previously described, the invention, using the capacity of the means 128, 128', consists of digital image-processing for determining or selecting the parameters of the optical system 122, 122' and/or of the image sensor or generator 124, 124' and/or of the servo-control system 126.

In diagram in FIG. 12 are represented the level of performances that can be attained with each one of the components of the apparatus when they are associated with digital image-processing means. Such levels are illustrated by the discontinued line 130 for the optical system, the discontinued line 132 for the sensor, the discontinued line 134 for the servo-control, and the discontinued line 136 for the apparatus.

Using such levels of performance that can be obtained with digital image-processing means, it is possible to select the performance levels for each one of the components of the apparatus which are, prior to processing, considerably lower than the levels of performance obtained after application of the processing means. Thereby, the levels of performance of the optical system can be set at level 130', and the levels of performance of the sensor and of the servo-control system can be set respectively at levels 132' and 134'.

Under these conditions, failing digital processing, the level of the performances of the apparatus would be at the lowest level, for example level 136' corresponding to the lowest level 130' for the optical system.

The digital image-processing means are preferably those described in the following documents:

Patent application EP 02751241.7, entitled: "Method and system for producing formatted data related to defects of appliances in a series of appliances and formatted data destined for image-processing means".

Patent application EP 02743349.9 for: "Method and system for modifying the qualities of at least one image originating from or destined to a series of appliances".

Patent application EP 02747504.5 for: "Method and system for reducing the frequency of updates for image-processing means".

Patent application EP 02748934.3 for: "Method and system for correcting chromatic aberrations of a colour image produced by an optical system".

Patent application EP 02743348.1 for: "Method and system for producing formatted data related to geometric distortions".

Patent application EP 02748933.5 for: "Method and system for providing, according to a standard format, formatted data to image-processing means".

Patent application EP 02747503.7 for: "Method and system for calculating an image transformed using a digital image and formatted data relating to a geometric transformation".

Patent application EP 02747506.0 for: "Method and system for producing formatted data related to defects of at least one apparatus in a series, notably to blur".

Patent application EP 02745485.9 for: "Method and system for modifying a digital image taking into account its noise".

Patent application PCT/FR 2004/050455 for: "Method and system for differentially and regularly modifying a digital image by pixel".

Such digital image-processing means enable to improve the image quality by activating at least one of the following parameters:

The geometric distortions of the optical system. It is recalled that an optical system can distort the images such that a rectangle can be deformed into a cushion, with a convex shape for each one of its sides, or into a cylinder with a concave shape for each one of its sides.

The chromatic aberrations of the optical system: if a targeted point is represented by three coloured spots having precise positions one in relation to the other, the chromatic aberration is translated by a variation in the position of such spots one in relation to the other, the aberrations generally being that much more significant the more one moves away from the centre of the image.

The parallax: when implementing an adjustment by deformation or movement of an optical element of the optical system, the image obtained on the image plane can be moved. The adjustment is, for example, an adjustment of the focal length or a focussing adjustment.

Such defect is illustrated by FIG. 13 in which an optical system 140 is represented with three lenses in which the centre of the image occupies the position 142 when the lens 144 occupies the position represented by a continual line. When the lens 144 moves into the position 144', represented by discontinued lines, the centre of the image adopts the position 142'.

Depth of the field: when the optical system is focussed on a determined object plane, not only the images of this plane remain sharp, but also those of the objects close to such plane. "Depth of field" refers to the distance between the nearest object plane and the farthest object plane for which the images remain sharp.

Vignetting: the luminosity of the image is generally maximal at the centre, progressively lowering as one moves away from the centre. Vignetting is measured, in percentage, by the difference between the luminosity in a particular point and the maximal luminosity.

The lack of sharpness of the optical system and/or the image sensor and/or generator is measured, for example, by the BXU parameter, such as is defined above.

The noise of the image is generally defined by its difference type, its shape and the size of the noise spot and its colouring.

The moiré phenomenon is a deformation of the image which occurs in the event of spatial high frequencies. The moiré is corrected by the parametering of anti-aliasing filters.

The contrast is the ratio between the highest and the lowest luminosity values of the image for which the details of the image still remain visible.

As represented in FIGS. 14a and 14b, it is possible to improve the contrast (FIG. 14a) of an image, i.e. to extend (FIG. 14b) the range of luminosities on which detail can be distinguished. Such extension is performed by notably using a contrast and noise correction algorithm.

Referring to FIG. 15, we are now going to describe an embodiment enabling to harmonise the sharpness within the image field.

First, it is recalled that the image surface of an object plane does not constitute a perfect plane, but represents a curve, known as the field curve. Such curve varies depending on diverse parameters, including the focal length and focussing. Thereby, the position of the image plane 150 depends upon the zone on which focussing is performed. In the example shown in FIG. 15, the plane 150 corresponds to focussing at the centre 152 of the image. In order to focus on a zone 154 near the edge of the image, the image plane 156 is located nearer to the optical system 122 than the image plane 150.

In order to simplify the focussing servo-control system, the image plane is placed in a position 158, mid-way between the positions 154 (corresponding to focussing on a zone near the edge of the image) and 150 (corresponding to focussing on a zone at the centre of the image). The uniting of the digital image-processing means 128 with the focussing servo-control 126 enables to limit the movement of the plane 158 for focussing, thus reducing the energy consumption of the servo-control system and enabling to reduce the volume of its components.

The diagram in FIG. 15a represents the blur properties with a standard servo-control focussing system wherein the maximum sharpness is obtained at the centre of the image. Thereby, on such diagram in FIG. 15a, the abscissa represents the field of the image and the ordinates represent the blur value expressed in BXU. Using such standard servo-control system, the blur measurement is, at the centre, by 1.3 and, at the edge of the image, by 6.6.

FIG. 15b is a similar diagram to that of FIG. 15a, showing the properties of a servo-control for an apparatus embodied according to the invention, on the assumption that the digital image-processing means enable to correct the blur up to a BXU value equal to 14. The curve represented in this diagram in FIG. 15b thus represents, at the centre of the image, a BXU value=2.6, with the BXU value lowering as one moves away from the centre, before increasing once again up to a value of 4 near the edge of the image. It is recalled that such value is the limit for enabling correction of the blur by digital processing means. Thereby, a sharp image can be obtained across the entire image field, whereas this is not so using an apparatus equipped with a standard system.

In an embodiment, the digital image-processing means comprise means for improving the sharpness, such that they enable to refrain from using a focussing servo-control.

As a comparable example, the diagrams in FIGS. 16a, 16b, 16c and 16d show the specifications of an apparatus obtained according to the state of the art and those of an apparatus obtained using the method according to the invention.

The standard device is a digital photographic apparatus integral with a mobile telephone having a VGA sensor, i.e. a resolution of 640×480, without a focussing system.

The standard apparatus has an aperture of 2.8, whereas the apparatus obtained using the method according to the invention has an aperture of 1.4.

FIG. 16a, which corresponds to the standard apparatus, is a diagram on which the abscissa represents the percentage of the image field, its origin corresponding to the centre of the image. The ordinate represents the vignetting V. FIG. 16b is a similar diagram for an apparatus obtained according to the invention.

In the schema of FIG. 16a (standard apparatus), the vignetting attains the value of 0.7 at the edge of the image, whereas in the diagram in FIG. 16b can be seen the optical system of the apparatus according to the invention, representing a vignetting considerably more significant, i.e. approximately 0.3. The correction limit for the algorithm used is 0.25. In other words, due to the correcting algorithm, it is possible to employ considerably more significant vignetting optics.

FIG. 16c is a diagram representing the blur ordinates, expressed in BXU, in accordance with the image field (represented in abscissa) for a standard apparatus. Using such standard apparatus, the blur specification is 1.5 at the centre and 4 at the edge of the image.

The diagram in FIG. 16d also represents the blur for the optics of the apparatus, obtained using the method according to the invention. In the diagram in FIG. 16d, the field of image is also represented in abscissa and the blur is represented in ordinates expressed in BXU. Such diagram in FIG. 16d shows that the blur at the centre of the image is approximately 2.2. It is, therefore, higher than the blur of the diagram in FIG. 16c. However, on the edges, a blur has been chosen in the region of 3, taking account of the correction algorithm limit.

In other words, surprisingly, a gradation lens was chosen with regard to the sharpness at the centre, even though it is possible to obtain the same results as when using the standard apparatus with, in addition, a greater aperture. It is also to be noted that on the edges, the optics of the apparatus according to the invention represent a similar quality to that of the standard optics, such result being possible due to the vignetting gradation in relation to a standard lens.

The diagrams in FIGS. 17a and 17b represent the specifications of the various optical systems from among which the selection has to be made in order to embody a capturing apparatus by using the method according to the invention.

In the example represented in FIG. 17a, the optical system provides an image spot 1100 with small dimensions. Such system shows a modulation transfer function (MTF) represented by a diagram where the spatial frequencies are in abscissa. The value of the shut-off frequency is fc. The MTF function comprises a step 1110 within the vicinity of the nil frequencies and a part rapidly decreasing towards the fc value.

The optics represented by the schema in FIG. 17b show an image spot 1114 having considerably larger dimensions than the image spot 1100, with its MTF showing the same fc shut-off frequency as in the case of FIG. 17a. However, the variation of this MTF depending on the spatial frequency is different: such frequency reduces in a relatively even manner from its origin down towards the shut-off frequency.

The choice of an optical system is based on the fact that the correction algorithm of the modulation transfer function is effective as from a value of 0.3. Under such conditions, we note that with the optics in FIG. 17b, a correction is obtained enabling to increase the MTF up to a value of $f_2$, for example, approximately 0.8 fc, whereas with the optics in FIG. 17a, the correction is only possible up to a frequency $f_1$ in the range of 0.5 fc.

In other words, with a correction algorithm, the optics represented in FIG. 17b provide more detail than the optics represented in FIG. 17a, and this despite the fact that the image spot is of greater dimensions than in the case of FIG. 17a. Hence, we will choose the optic corresponding to FIG. 17b.

Application on the Increase of the Depth of Field

We are now going to describe an embodiment variant of the method for which the sensor and/or the optics system are more specifically adapted to the increase in the depth of field.

The CMOS or CCD standard sensors are often sensors formed using a mosaic of pixels, referred to as "Bayer". The Bayer mosaic consists of a succession of 2×2 pixels, formed by 2 green pixels (i.e. a photosite sensitive to the light within a spectral range around 550 nm), by a red pixel (spectral range around 600 nm) and by a blue pixel (spectral range around 450 nm). The spectral ranges are shown in FIG. 2.

Depending on the sensors, the spectral bands of the green colour, of the red colour and of the blue colour differ, showing an overlapping more or less significant. Significant overlapping among these three bands has the effect of reducing the sensitivity of the sensor to colours (it becomes "colour blind"), but increases its overall sensitivity to the light and conversely.

Significant overlapping among these three bands also reduces the sharpness differences between the colours, thus notably reducing the range of distances for which at least one of the three colours is sharp.

Hence, advantageously, according to the invention, it is possible to adapt the spectral bands, for example, by reducing their overlapping so as to increase the range of distances for which at least one of the three colours is sharp.

Such adaptation could also be conducted in conjunction with the design of the optics and, depending on the constraints weighing on the digital processing of the image.

Description of a Sensor Optimising the Method According to the Invention

In an embodiment variant of the method, the sensor and/or the optics system are more specifically adapted to applications enabling to provide precise distance indications for the imaged objects.

In this embodiment variant, we shall use a Bayer pixel mosaic.

It is common that the sensors represent a significant number of pixels providing aberrant digital values. These pixels are commonly called "burned pixels" (or "pixels morts" i.e. "dead pixels" in French). Thereby, image-generating digital processing contains a filtering step for these aberrant values in order to erase, from the generated image, the aberrant values of these pixels to make them invisible.

The precision of the distance measurements according to the method notably depend upon the variation of the relative sharpness depending on the distance. Such variation depends upon the amount of chromatic aberration that may be obtained with the capturing system (sensor and optics). Having said that, the spectral frequency range for the visible light, hence the light available for photography, is relatively restricted: approximately 400 nm to 700 nm. Thereby, the relative sharpness variation depending on the distance thus becomes limited when using a standard Bayer sensor.

Several possible ways exist in which to alter a sensor beyond such limitation. A simple manner consists of using a different spectral band in addition to the standard colours of red, green and blue, e.g. a 800 nm-900 nm band or any other band above and/or below the visible spectre. The pixels sensitive to such fourth spectral band will not necessarily be useful to the rebuilding of the visible image, but will mainly serve for estimating the distance of the objects in comparison to the relative sharpness on this fourth spectral band with one or several of the three standard colours.

Hence, it will be possible to advantageously arrange the pixels in the following manner: by departing from a standard red, green, blue Bayer layout, all the N×M pixels and several other pixels will be substituted by pixels that are sensitive within such fourth spectral band. By selecting N and M with a rather large factor (for example, 64 each) and by substituting 9 of the pixels, we can thus ensure that only approximately 1 pixel out of 1000 in the standard Bayer mode is affected. Hence, during the building of the image, such pixels will be considered as "burned pixels" with their values being filtered.

Thereby, a photographic apparatus is obtained, enabling to provide more precise distance indications of the imaged objects every N×M pixels of the image.

Description of a Second Sensor Optimising the Method According to the Invention

In another embodiment, shown in FIG. 20.2, we depart from a standard Bayer layout in which are provided three pixels R, G, B and one pixel U corresponding to a part of a UV or infrared spectral band. By infrared and/or ultraviolet is meant all parts of the spectre beyond or below the visible spectre, notably the near infrared, such as 700 to 800 or 700 to 900 nm, or the near ultraviolet, near by 400 nm. Such pixel U is used to improve the sharpness of the visible colours as shown in the diagram of FIG. 20.1.

On this diagram are noted: the distances "d" of the objects imaged with a capturing apparatus, in abscissa, and the diameter "D" of the blur spot, in ordinates. The curves, 20.3, 20.4, 20.5 and 20.6 represent the variation of the diameter "D" depending on the distance "d" for, respectively, the red "R", the green "G", the blue "B" and the ultraviolet "U". The right 20.7 represents the threshold of sharpness defining the depth of field.

Hence, the distance "d1" represents the limit of the depth of field for a capturing apparatus comprising "RGB" pixels and not U pixels, while using the method for improving sharpness according to the invention. The distance "d2" represents the limit of the depth of field obtained with a capturing apparatus comprising the sensor represented in FIG. 20.2 and using the method for improving sharpness according to the invention. The "U" pixels serve only to reflect the sharpness of the "U" colour onto the "RGB" colours for those objects located between the distances "d1" and "d2". Hence, the final image will only comprise the three "RGB" colours (or any other known visible colour span).

As a variant, pixels sensitive to the near infrared will be added in order to improve the sharpness on greater distances.

Increase of the Longitudinal Chromatic Aberrations

According to the invention, advantage is taken of the existence of variations in the relative sharpness between two colours depending on the distance of the objects. Hence, we will be able to design optics representing relative sharpness between the three very different colour planes depending on the distance. Such optics are said to represent high longitudinal chromatic aberrations.

In a practical sense, optics could, for example, be designed so that on a wide range of distances: the smallest of the spot diagram diameters (diameter of the blur spot) from among the three colours is below a first pre-determined threshold, and the biggest of the spot diagram diameters from among the three colours is below a second pre-determined threshold. Alternatively, the BxU value could be used instead of the diameter of the spot diagram.

The two thresholds are determined according to, for example, the capacities and constraints of the digital processing for generating the image, on the one hand (like, for example, the size of the filter "F" described below), and the specifications of the sensor, on the other.

FIG. 18 represents an example of the BXU measurements (Y-axis) pour the three RVB colour planes, depending on the distance (axis in abscissa) for a lens designed in this manner. The values shown are those at the centre of the image field. For each point of the image field, various, although similar, curves can be measured. S1 and S2 designate the two thresholds described above. The range of distances complying with the above two criteria is thus, for this lens, approximately 12 cm-infinity (d1→infinity in FIG. 18), which implies that it is possible to rebuild a sharp image for scenes imaged within such range of distances.

Using a standard lens would have resulted in three curves, near to the curve of the red R colour in FIG. 18, and thus in an optics system only enabling the rebuilding of sharp images for objects located at far-off distances, 25 cm-infinity (d2→infinity in FIG. 18).

Hence, it is also possible to use a lens having longitudinal chromatic aberrations, such as for a given focus, aperture and focal length, where there exists at least one colour for which the distance involving the best sharpness is lower than $$k \frac{f^2}{O.P}$$

k being a coefficient less than 0.7, preferably lower than 0.5, f being the focal distance, O being the aperture and P having the smallest (among all colours of the image) diameter of the blur spot of an object point situated in infinity.

Application on the Automatic Resolution Adaptation

We are now going to describe an embodiment variant of the invention enabling to automatically adapt the resolution of the image to the possible blur linked to a shot beyond the depth of field of the capturing apparatus.

When the imaged scene is too close-up (below the depth of field), the image is blurred, i.e. the spot diagram (the blur spot) occupies an additional spot having X pixels in diameter, X being a pre-determined diameter defining the limit of the depth of field. A digital sub-sampling of the image (zoom out), shall reduce the size of the blur spot by a factor dependant upon the type of sub-sampling used, though typically within the size-range of the considered sub-sampling factor. Thereby, a sharp image will be able to be generated using the digital image, though of lower resolution by selecting the sub-sampling factor so that the blur spot is lower, once the image has undergone sub-sampling, at given threshold.

As a variant, in order to minimise calculations, we shall begin by sub-sampling, as described above, before increasing the sharpness according to the invention.

Application on the Alteration of Sharpness—Filtering

As for the distance measurement (FIG. 8), it is possible to extract the expected sharpness from each colour of the digital image using the relative sharpness measurement between two colour planes.

According to an embodiment of the invention, the process includes a sharpness alteration for each pixel of the zone Z', by way of a filter mixing the pixel values within a predetermined vicinity of each pixel, the filter parameters depending upon the measured relative sharpness.

Indeed, an image-capturing device equipped with a lens will show different sharpness depending on the colour planes and according to the distance of the imaged objects. The fact of the sharpness (or the blur) being dependent upon the distances of the imaged objects makes it impossible to increase sharpness by using a pre-determined process, such as a filtering of pre-determined sharpness.

An embodiment variant of the invention consists in selecting or in adapting the sharpness filters to the measured relative sharpness.

A particular case, already described, of the adaptation of the filtering or alteration of sharpness consists of reflecting the sharpness of the sharp colour onto at least one other improved colour, such reflection being achieved by using a calculation of the type CA=CN+F(CO−CN), where CA represents this improved colour, CO represents the improved colour prior to processing, CN represents the sharp colour and F represents a filter, namely a low-pass filter.

However, in a more general manner, a sharpness filter involving all (or a sub-group of all) colours could be used. Hence, in the case of a digital image RGB (or RVB) for processing the value of a pixel P, the filter M may alter the value of pixel P, depending on the values of the pixels within a vicinity of the pixel P on all three colours.

For example, by noting RN, GN, BN, the digital data relating to the red, green and blue colours of the digital image, and RA, GA, BA, the digital data relating to the colours of the improved image, it is possible to select the filter M, such as an operator undertaking the following operations:

$GA=GN+c\_GG*M\_GG(GN)+c\_GR*M\_GR(RN)+c\_GB*M\_GB(BN)$ $RA=RN+c\_RG*M\_RG(GN)+c\_RR*M\_RR(RN)+c\_RB*M\_RB(BN)$ $BA=BN+c\_BG*M\_BG(GN)+c\_BR*M\_BR(RN)+c\_BB*M\_BB(BN)$,

Where:

M_{R,G,B}{R,G,B} represent the filters, which can be selected like linear filters with a nil sum, like for example, the high-pass frequency filters. c_{R,G,B}{R,G,B} represents the coefficients balancing the impact of each filter M_{R,G,B}{R,G,B}.

Such filtering example may also reflect the sharpness of the sharpest colour onto the others. For example, supposing that only the colour blue is sharp, the high-pass filters M_{R,G,B}{R,G,B} will provide values nearing 0 when applied to the colours green and red which are blurred in the example. In this particular case, GA shall thus be equal to GN plus c_GB*M_GB(BN), i.e. GN plus the high frequencies of the blue colour. The green colour thus inherits the sharpness of the sharp colour (the blue). The same applies for the red colour.

In practice, the sharpness of the colours is not a binary factor; hence, the filters M_{R,G,B}{R,G,B} and the coefficients c_{R,G,B}{R,G,B} may be adapted to the various possible values of the colour sharpness.

An embodiment example of such adaptation, in the context of RGB images stemming from a given capturing apparatus, is as follows:

The relative sharpness values of the red are considered in relation to the green; likewise the blue in relation to the green: V_GR, V_GB. Such values are quantified so that the values thus quantified constitute an entry into a table 2D of reasonable size. For each entry (V_BR, V_BG quantified value couples), a set of filters M_{R,G,B}{R,G,B} is associated, as well as a set of adapted coefficients c_{R,G,B}{R,G,B}. In the particular case where we are seeking to improve the sharpness of the digital image, the filters M_{R,G,B}{R,G,B} and a set of coefficients c_{R,G,B}{R,G,B} can be pre-determined for each entry, thus ensuring that the sharpness of a digital image, taken by the capturing apparatus and having relative sharpness corresponding to the entry, is perfectly corrected through application of the filter M.

It will also be possible to refine the filter M in order to take account of the fact that the three colours do not vary on a large scale in the same manner, notably in the coloured zones (as oppose to the black, grey or white zones) of the digital image. For that, it will be possible, for example, to balance out, in each pixel P of the zone Z', the actions of the filters M_{R,G,B}{R,G,B} by increasing the relative variations of the colours within a vicinity of the pixel P.

In certain case, the association table between considered relative sharpness and a set of filters may comprise other entries like, for example, the position of the zone Z' within the field of the image or the parameters of the shots as the value of the focal length, of the aperture, of the focussing distance, etc., and of the optics system during picture-taking. Indeed, it is common that the sharpness specifications of a digital image also depend upon these factors.

Thereby, in order to correct the sharpness of a digital image, the image field will first be divided up into several zones Z' and the method will be applied to each one of the zones. The division shall preferably be performed according to the sharpness specifications of the colours so that the sharpness of the colours in each zone reveal a certain harmony.

With this embodiment can be obtained an automatic adaptation of the sharpness filtering applied to the digital image, and to the distance between the imaged scene and the capturing apparatus. It is also to be noted that, through using the relative sharpness, such automatic adaptation to the distance can be done without having explicit knowledge of such distance.

Beyond the sharpness alteration of the digital image, such embodiment of the method also enables the automatic adaptation of processes aiming, for example, to correct optical and/or sensor defects whose effects on the image depend on the distance between the imaged scene and the capturing apparatus. The blur (or loss of sharpness) is an example, though other optical and/or sensor defects, such as geometric distortions or vignetting, constitute other examples.

Principles of the Invention
Description of FIGS. 19.1, 19.2, 19.3

FIGS. 19.1, 19.2 and 19.3 show the steps of the method in accordance with the invention, according to several embodiment modes.

FIG. 19.1 represents an image 10 comprising a region R and having two colours 195 and 196, a measurement of relative sharpness 190 between the two colours 195 and 196 within the region R of the image 10, a function 191 activated depending on the measured relative sharpness. As an option, the function activated depends upon a mode 193 corresponding, for example, to a selection made by the user of the apparatus, and/or a specification of the capturing apparatus during picture-taking.

FIG. 19.2 represents an image 10 comprising a region R and having two colours 195 and 196, a measurement of relative sharpness 190 between the two colours 195 and 196 within the region R of the image 10, a function 191 activated depending on the measured relative sharpness comprising a processing of the image 10 and producing a processed image 192. As an option, the function activated also depends upon a mode 193 corresponding, for example, to a selection made by the user of the apparatus, and/or a specification of the capturing apparatus during picture-taking.

FIG. 19.3 represents an image 10 comprising a region R and having two colours 195 and 196, a measurement of relative sharpness 190 between the two colours 195 and 196 within the region R of the image 10, a function 191 activated depending on the measured relative sharpness comprising a processing of another image 194 and producing a processed image 198. As an option, the function activated also depends upon a mode 193 corresponding, for example, to a selection made by the user of the apparatus, and/or a specification of the capturing apparatus during picture-taking.

Application on the Alteration of the Contrast and/or of the Brightness and/or of the Colour and/or of the Sharpness We are now going to describe an embodiment of the invention in which the function activation consists of modifying the image contrast and/or luminosity and/or colour, depending on the relative sharpness between at least two colours within at least one region R of the image.

Using the relative sharpness between at least two colours in at least one region R of the image, directly or indirectly (for example, with a step for estimating the geometry of the scene in 3 dimensions), enables, for example, to simulate the addition of a local lighting, for example, a flashlight positioned anywhere in the scene, and/or, conversely, to reduce the effect of a flash or lighting of various colours within the scene. Hence, it is possible to reduce the backlighting and flat-tint effects of light linked to the flash.

In an embodiment, a digital image is divided into regions depending on the relative sharpness between at least two colours, in order that each image region in a part of the scene is located within a range of given distances and which is oriented in a given direction. An indication of the direction can be obtained using the local variation of the relative sharpness in the image. An indication of the distance can be obtained using the relative sharpness, as described above. It is also possible to directly use the relative sharpness and its variation without passing by a distance and an orientation.

In order to add or modify a lighting, it is possible to determine, for each region, the quantity and the colour of the light to be added or removed for each point, since the distance to the simulated source in relation to the imaged point is known, as is the orientation of the imaged object in relation to the source.

In an embodiment, the geometry of the scene in three dimensions is reconstituted by measuring the distance via a large number of points in the image. We will thus use a known art in the field of image synthesis for the purpose of adding lighting to the scene (ray casting or other).

In an embodiment, a lighting is added to the main subject or subjects, as adapted to each subject in order to provoke a "fill-in" effect simulating one or several flashlights positioned opposite or on the side of each subject. This operation can be conducted automatically and independently for each subject. Using the known art, the addition of lighting for each subject is only possible by way of studio lighting.

Similarly, it is possible to determine the strength of the flashlight according to the nearest subject for the purpose of illuminating it correctly, and then to complete lighting on the other subjects by adding a simulated lighting.

It is also possible to determine the colour of the lighting for each region by way of a known method for estimating the white balance and then to render uniform the colour of the scene's lighting. In the state of the art, white balance is generally estimated due to lack of information on the 3-dimensional geometry of the scene.

Description of FIGS. 18.1 and 18.2

FIG. 18.1 represents a sensor 2, producing a raw image 180 undergoing a pre-treatment, for example white balancing, and/or a compensation of the black level, and/or a noise reduction, in order to produce a pre-processed image 182. Also represented is a relative sharpness measurement 190 activating a function 191 corresponding to a process implementing the pre-treated image 182 and the measurement of relative sharpness 190, in order to produce a processed image 192. Finally is represented a downstream process of the processed image 192, corresponding, for example, to a demosaicing or to other necessary processes for converting a visible raw image.

FIG. 18.2 represents a sensor 2, producing a raw image 180. Also represented is a relative sharpness measurement 190 activating a function 191 corresponding to a process implementing the raw image 180 and the measurement of relative sharpness 190, in order to produce a processed image 192. Finally is represented a downstream process of the processed image 192, corresponding, for example, to a demosaicing or to other necessary processes for converting a raw image into a visible image.

In a variant, the function implements a process on a visible image.

Simplification of the Optics

The invention is applied to an apparatus comprising variable parameters when capturing the digital image and having an influence on the sharpness of the colours, notably a capturing apparatus with a zoom, and/or a lens with variable focussing and/or a variable aperture. Thus, the sharpness curves 8.2 and 8.3 shall be used, corresponding to the value of the variable parameters according to the digital image.

As described, the invention enables to digitally restore focussing without a mobile unit and without delay, which thus enables to reduce the complexity of a zoom by removing at least one mobile part. For example, according to the distance of the subject and of the focal length, the relative sharpness between two colours can be variable, whereas this is not acceptable in the known optics.

The invention claimed is:

1. A method for improving a sharpness of at least one color of a digital image, from an image-capturing device, comprising:
   selecting from among the colors at least one color as a sharp color; and
   reflecting the sharpness of the sharp color onto at least one other improved color, so that the improved colour represents increased sharpness,
   wherein repercussion of the sharpness of the sharp color on the at least one other improved color is based on a calculation of a type CA=CN+F(CO−CN), where CA represents the improved color, CO represents the improved color prior to processing, CN represents the sharp color, and F represents a filter, the filter being a low-pass filter.

2. The method according to claim 1, further comprising:
   decomposing the digital image into regions, said sharp color being selected for each region.

3. The method according to claim 2, said method further comprising:
   determining a distance between the image-capturing device and at least one object of a captured scene by using the sharpness of at least two colors in an image region of said object.

4. The method according to claim 3, further comprising:
   reducing the sharpness of the at least one color within the at least one image region.

5. The method according to claim 3, further comprising:
   determining a servo-control instruction for said image-capturing device based on the sharpness of the at least two colors such that focusing is achieved in fewer steps and is accelerated.

6. The method according to claim 1, said sharp color selection being that of choosing the sharpest color according to a pre-determined rule.

7. The method according to claim 1, said sharp color selection being pre-determined.

8. The method according to claim 1, said sharp color selection depending on a distance between the image-capturing device and at least one object of a captured scene to obtain said digital image.

9. The method according to claim 1, said image-capturing device having a macro mode, said sharp color selection depending upon activation of the macro mode.

10. The method according to claim 1, the image-capturing device having lens, and said method further comprising:
    selecting lens from among a series of pre-determined lenses, said lens representing specifications such that the images of an object having at least two pre-determined distances represent distinct sharp colors, thus improving at least one of a depth of field and reducing a cost of the lens.

11. The method according to claim 1, the image-capturing device having lens, and said method further comprising:
    designing the lens, said lens representing specifications such that the images of an object with at least two pre-determined distances represent distinct sharp colors:
    in order that at least one of a depth of field, an aperture, and another optical specification is improved and/or a cost of the optics is reduced, and
    in order that a mechanical focusing can be achieved by using fewer positions.

12. An image-capturing and reproducing apparatus comprising:
    an optical system for capturing and reproducing images;
    an image sensor;
    an image generator; and a servo-control system, the image being processed by the method according to claim 1, the method further comprising:

a user determining or selecting parameters for at least one of the optical system, the sensor, the image generator, and the servo-control system, using a capacity to process images, and to improve the sharpness of the color depending on the sharpness of another color, in order to minimise costs and/or to optimise performances of the image-capturing and reproducing apparatus.

13. An image-capturing and reproducing apparatus using the color-improvement method according to claim 1.

14. A digital image-processing device implementing the method according to claim 1.

* * * * *